(12) United States Patent
Kamat et al.

(10) Patent No.: US 11,421,309 B2
(45) Date of Patent: Aug. 23, 2022

(54) HIGH STRENGTH 7XXX ALUMINUM ALLOYS AND METHODS OF MAKING THE SAME

(71) Applicant: Novelis Inc., Atlanta, GA (US)

(72) Inventors: Rajeev G. Kamat, Marietta, GA (US); Dhruba J. Chakrabarti, Rego Park, NY (US); Rashmi Ranjan Mohanty, Roswell, GA (US); Rahul Vilas Kulkarni, Marietta, GA (US); Duane E. Bendzinski, Woodstock, GA (US); Juergen Timm, Steisslingen (DE)

(73) Assignee: Novelis Inc., Atlanta, GA (US)

( * ) Notice: Subject to any disclaimer, the term of this patent is extended or adjusted under 35 U.S.C. 154(b) by 0 days.

(21) Appl. No.: 15/336,982

(22) Filed: Oct. 28, 2016

(65) Prior Publication Data

US 2017/0121802 A1    May 4, 2017

Related U.S. Application Data

(60) Provisional application No. 62/248,796, filed on Oct. 30, 2015, provisional application No. 62/326,858, filed on Apr. 25, 2016.

(51) Int. Cl.
| | |
|---|---|
| *C22F 1/053* | (2006.01) |
| *B62D 29/00* | (2006.01) |
| *B64D 11/06* | (2006.01) |
| *B64C 3/00* | (2006.01) |
| *B64C 9/00* | (2006.01) |
| *C22C 21/10* | (2006.01) |
| *B64C 1/06* | (2006.01) |
| *C22C 21/00* | (2006.01) |
| *B64C 1/00* | (2006.01) |

(52) U.S. Cl.
CPC ............ *C22F 1/053* (2013.01); *B62D 29/008* (2013.01); *B64C 1/06* (2013.01); *B64C 3/00* (2013.01); *B64C 9/00* (2013.01); *B64D 11/06* (2013.01); *C22C 21/00* (2013.01); *C22C 21/10* (2013.01); *B64C 2001/0081* (2013.01)

(58) Field of Classification Search
CPC .................................. C22C 21/00; C22C 21/10
See application file for complete search history.

(56) References Cited

U.S. PATENT DOCUMENTS

| | | | |
|---|---|---|---|
| 4,410,370 | A | 10/1983 | Baba et al. |
| 4,462,843 | A | 7/1984 | Baba et al. |
| 4,569,703 | A | 2/1986 | Baba et al. |
| 4,623,517 | A * | 11/1986 | Biolik ............... C04B 41/009 422/40 |
| 4,629,517 | A | 12/1986 | Lifka et al. |
| 4,869,870 | A | 9/1989 | Rioja et al. |
| 4,927,470 | A | 5/1990 | Cho |
| 4,946,517 | A | 8/1990 | Cho |
| 4,988,394 | A | 1/1991 | Cho |
| 6,861,609 | B2 | 3/2005 | Sigler et al. |
| 7,249,482 | B2 | 7/2007 | Chen et al. |
| 8,222,560 | B2 | 7/2012 | Sigler et al. |
| 8,274,010 | B2 | 9/2012 | Sigler et al. |
| 8,350,179 | B2 | 1/2013 | Schroth et al. |
| 8,436,269 | B2 | 5/2013 | Sigler et al. |
| 8,525,066 | B2 | 9/2013 | Sigler et al. |
| 8,833,215 | B2 | 9/2014 | Sigler et al. |
| 8,851,811 | B2 | 10/2014 | Sigler et al. |
| 8,927,894 | B2 | 1/2015 | Sigler et al. |
| 9,249,484 | B2 | 2/2016 | Kamat et al. |
| 2005/0006010 | A1 * | 1/2005 | Benedictus ............ C22C 21/10 148/552 |
| 2005/0034794 | A1 * | 2/2005 | Benedictus ............ C22F 1/053 148/552 |
| 2005/0189044 | A1 * | 9/2005 | Benedictus ............ C22C 21/10 148/552 |
| 2007/0017586 | A1 | 1/2007 | Bohaychuk |
| 2007/0074791 | A1 | 4/2007 | Yoshida et al. |
| 2007/0175868 | A1 | 8/2007 | Christensen et al. |
| 2010/0258536 | A1 | 10/2010 | Sigler et al. |
| 2012/0014182 | A1 | 1/2012 | Wang et al. |

(Continued)

FOREIGN PATENT DOCUMENTS

| | | |
|---|---|---|
| CN | 1780925 | 5/2006 |
| CN | 1780926 | 5/2006 |

(Continued)

OTHER PUBLICATIONS

International Patent Application No. PCT/US2016/059272, International Preliminary Report on Patentability dated May 11, 2018, 8 pages.
International Patent Application No. PCT/US2016/059272, Third Party Observation filed Jul. 25, 2017 and dated Jul. 26, 2017, 5 pages.
Canadian Pat. Appl. No. 2,979,717, Office Action dated Sep. 5, 2018, 6 pages.
Azo Materials, "Aluminium/Aluminum 7050 Alloy (UNS A97050)," Sep. 18, 2012, Retrieved from Internet URL: https://www.azom.com/article.aspx?ArticleI0=6650.
Azo Materials, "Aluminum 7150 Alloy (UNS A97150)," May 8, 2013, Retrieved from Internet, URL https://www.azom.com/article.aspx?ArticleID=8766.
Tadic et al., "Superplastic Deformation of An X7093 Al Alloy," Materials and Technology, 2014, pp. 321-325, vol. 48, No. 3.

(Continued)

*Primary Examiner* — Ngoc-Yen Nguyen
(74) *Attorney, Agent, or Firm* — Kilpatrick Townsend & Stockton LLP

(57) ABSTRACT

Described herein are novel 7xxx series aluminum alloys. The alloys exhibit high strength. The alloys can be used in a variety of applications, including automotive, transportation, electronics, aerospace, and industrial applications. Also described herein are methods of making and processing the alloys. Further described herein are methods of producing a metal sheet, which include casting an aluminum alloy as described herein to form an ingot, homogenizing the ingot, hot rolling the ingot to produce a hot band, and cold rolling the hot band to a metal sheet of final gauge.

31 Claims, 10 Drawing Sheets

(56) References Cited

U.S. PATENT DOCUMENTS

| | | | |
|---|---|---|---|
| 2012/0055588 A1* | 3/2012 | Kamat | C22C 21/10 148/551 |
| 2012/0141829 A1 | 6/2012 | Oikawa et al. | |
| 2013/0015164 A1 | 1/2013 | Sigler et al. | |
| 2013/0048613 A1 | 2/2013 | Sigler et al. | |
| 2013/0092671 A1 | 4/2013 | Sakai | |
| 2013/0168367 A1 | 7/2013 | Sigler et al. | |
| 2013/0306604 A1 | 11/2013 | Sigler et al. | |
| 2014/0069557 A1 | 3/2014 | Smeyers, Sr. et al. | |
| 2014/0076859 A1 | 3/2014 | Sigler et al. | |
| 2014/0231396 A1 | 8/2014 | Yang et al. | |
| 2014/0251511 A1 | 9/2014 | Lin | |
| 2015/0020930 A1 | 1/2015 | Kamat et al. | |
| 2015/0083694 A1 | 3/2015 | Sigler et al. | |
| 2015/0217821 A1 | 8/2015 | Campbell | |
| 2016/0122852 A1 | 5/2016 | Kamat et al. | |
| 2017/0016102 A1* | 1/2017 | Nakanishi | C22C 21/10 |
| 2017/0232547 A1 | 8/2017 | Chai et al. | |

FOREIGN PATENT DOCUMENTS

| | | | | |
|---|---|---|---|---|
| CN | 102251158 | A | | 11/2011 |
| EP | 1306455 | | | 5/2003 |
| EP | 2868419 | A1 | | 5/2015 |
| EP | 2518173 | B1 | | 11/2017 |
| EP | 2899287 | | | 3/2018 |
| GB | 476930 | | | 12/1937 |
| JP | 5651560 | | | 5/1981 |
| JP | 57161045 | | | 10/1982 |
| JP | 58113358 | | | 7/1983 |
| JP | 03122243 | | | 5/1991 |
| JP | 03221450 | | | 9/1991 |
| JP | 10168553 | A | * | 6/1998 |
| JP | 2002103054 | | | 4/2002 |
| JP | 2002348631 | | | 12/2002 |
| JP | 2003145277 | | | 5/2003 |
| JP | 2004098107 | | | 4/2004 |
| JP | 2005334971 | A | | 12/2005 |
| JP | 2008516079 | | | 5/2008 |
| JP | 2010159489 | | | 7/2010 |
| JP | 2012184505 | A | * | 9/2012 |
| JP | 2013542319 | | | 11/2013 |
| JP | 2015071823 | | | 4/2015 |
| JP | 2015093282 | | | 5/2015 |
| JP | 2015193020 | | | 11/2015 |
| KR | 0153288 | | | 11/1998 |
| WO | 2004090183 | | | 10/2004 |
| WO | 2004090185 | | | 10/2004 |
| WO | 2006037648 | | | 4/2006 |
| WO | 2010049445 | | | 5/2010 |
| WO | 2012033939 | | | 3/2012 |
| WO | WO-2015133011 | A1 | * | 9/2015 ............. C22C 21/10 |

OTHER PUBLICATIONS

Wu, K. C., "Resistance Spot Welding of High Contact-Resistance Surfaces for Weldbonding," Welding Research Supplement, Dec. 1975, pp. 436-s-443-s, American Welding Society, Miami, Florida.
"International Alloy Designations and Chemical Composition Limits for Wrought Aluminum and Wrought Aluminum Alloys," Registration Record Series: Teal Sheets, Feb. 1, 2009, The Aluminum Association, Inc., 35 pages.
International Patent Application No. PCT/US2016/059272, International Search Report and Written Opinion dated Mar. 15, 2017, 10 pages.
Chinese Patent Application No. 201680016341.5, "First Office Action", dated Jun. 26, 2018; 18 pages.
European Patent Application No. 16834065.1, "Communication pursuant to Article 94(3)," dated Jun. 29, 2018; 4 pages.
Chinese Application No. 201680016341.5 , "Office Action", dated Dec. 28, 2018, 17 pages.
Japanese Application No. 2017-549177 , "Office Action", dated Nov. 6, 2018, 8 pages.
Australian Application No. 2016344192 , "First Examination Report", dated Mar. 5, 2019, 4 pages.
European Application No. 16834065.1 , "Notice of Decision to Grant", dated Feb. 14, 2019, 2 pages.
Russian Application No. 2018119275 , "Office Action", dated Feb. 12, 2019, 13 pages.
Russian Application No. 2018119275 , "Office Action", dated Jul. 4, 2019, 9 pages.
Australian Application No. 2016344192 , "Second Examination Report", dated Jun. 21, 2019, 2 pages.
Chinese Application No. 201680016341.5 , "Office Action", dated Jun. 17, 2019, 14 pages.
European Application No. 19162213.3 , "Extended European Search Report", dated May 9, 2019, 7 pages.
Canadian Application No. 2,979,717 , "Notice of Allowance", dated Apr. 18, 2019, 1 page.
Korean Application No. 10-2017-7033460 , "Office Action", dated Apr. 8, 2019, 15 pages.
Japanese Application No. 2017-549177 , "Office Action", dated Aug. 6, 2019, 7 pages.
Australian Application No. 2016344192 , "Fourth Examination Report", dated Feb. 13, 2020, 7 pages.
Brazilian Application No. 1120170214903 , "Office Action", dated Mar. 10, 2020, 5 pages.
European Application No. 19162213.3 , "Office Action", dated Mar. 2, 2020, 4 pages.
Korean Application No. 10-2017-7033460 , "Office Action", dated Mar. 4, 2020, 7 pages.
Russian Application No. 2018119275 , "Notice of Decision to Grant", dated Jan. 20, 2020, 17 pages.
Korean Application No. 10-2017-7033460 , "Office Action", dated Oct. 23, 2019, 17 pages.
Australian Application No. 2016344192 , "Third Examination Report", dated Dec. 17, 2019, 4 pages.
Australian Application No. 2016344192, Notice of Acceptance dated Mar. 12, 2020, 3 pages.
European Application No. 19162213.3, Office Action dated Jun. 2, 2020, 5 pages.
Indian Application No. 201717033152 , "First Examination Report", dated Sep. 10, 2020, 8 pages.
Korean Application No. 10-2017-7033460, Office Action dated May 6, 2020, 11 pages (4 pages of Original Document and 7 pages of English Translation).
Chinese Application No. 201680016341.5, Office Action, dated Mar. 23, 2021, 13 pages.
European Application No. 19162213.3, Notice of Decision to Grant, dated Mar. 18, 2021, 2 pages.
Israeli Application No. 258885, Office Action, dated Jan. 11, 2021, 16 pages.
Japanese Application No. 2017-549177 , Office Action, dated Jan. 19, 2021, 27 pages.
Chinese Application No. 201910876108.X, Office Action, dated Nov. 24, 2020, 12 pages.
Japanese Application No. 2019-212143, Office Action, dated Dec. 22, 2020, 9 pages.
Chinese Application No. 201910876108.X , Office Action, dated Oct. 29, 2021, 11 pages.
Korean Application No. 10-2020-7016197 , Office Action, dated Oct. 21, 2021, 12 pages.
Chinese Application No. CN201910876108-X,Office Action, dated Jun. 22, 2021, 13 pages.
Japanese Application No. 2017-549177, Office Action, dated May 18, 2021, 14 pages.
Brazilian Application No. BR112017021490-3, Office Action, dated Jul. 21, 2021, 9 pages.
Japanese Application No. 2017-549177, Notice of Decision to Grant, dated Oct. 5, 2021, 2 pages.
Korean Application No. 10-2020-7016197, Office Action, dated Apr. 3, 2022, 19 pages.

* cited by examiner

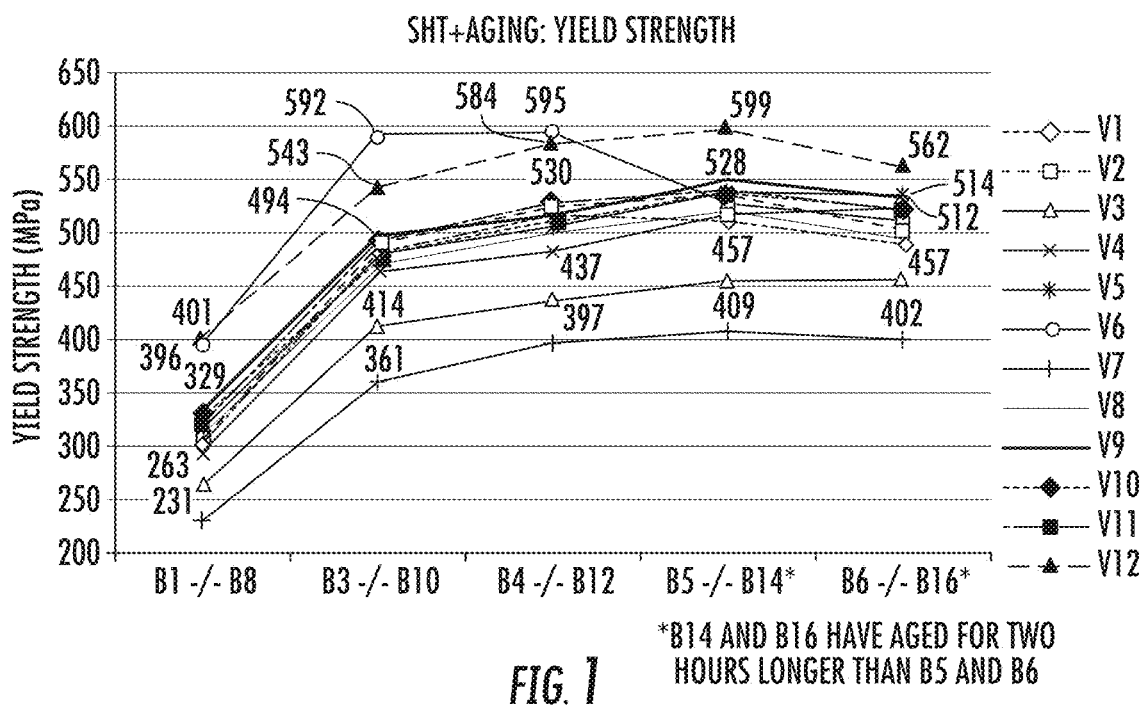
FIG. 1 *B14 AND B16 HAVE AGED FOR TWO HOURS LONGER THAN B5 AND B6
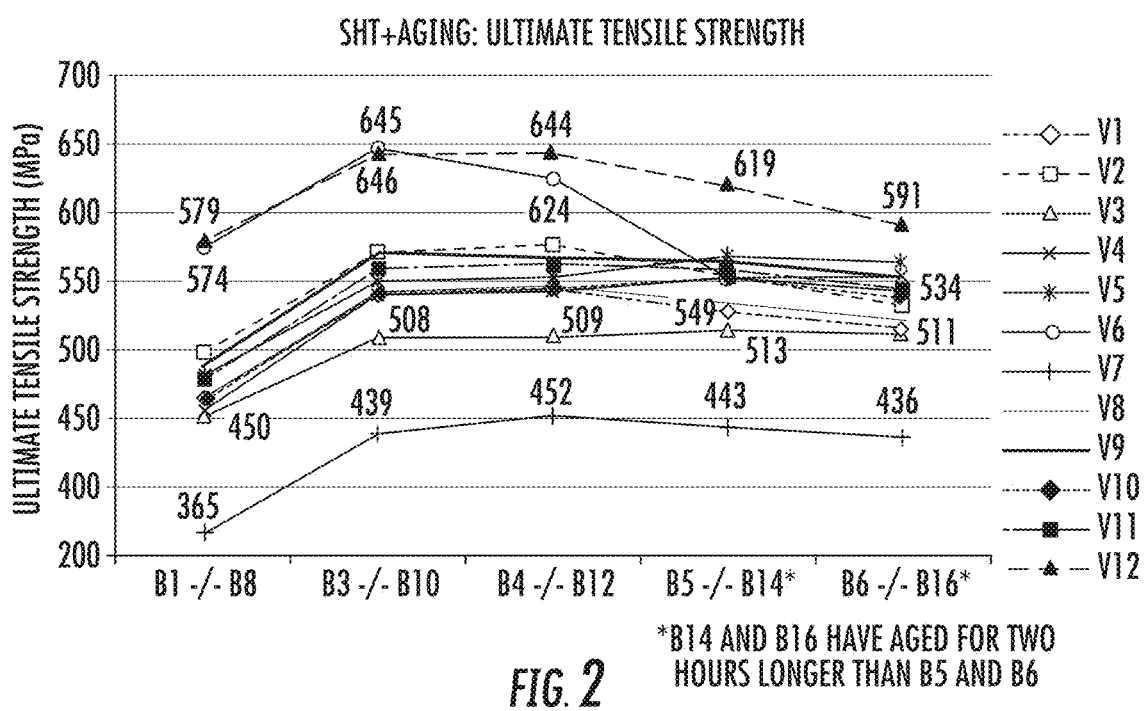
FIG. 2 *B14 AND B16 HAVE AGED FOR TWO HOURS LONGER THAN B5 AND B6

HIGH STRENGTH 7XXX ALUMINUM ALLOYS AND METHODS OF MAKING THE SAME

CROSS REFERENCE TO RELATED APPLICATIONS

The present application claims priority to and filing benefit of U.S. provisional patent application Ser. No. 62/248,796 filed on Oct. 30, 2015 and U.S. provisional patent application Ser. No. 62/326,858 filed on Apr. 25, 2016, both of which are incorporated herein by reference in their entireties.

FIELD

Provided herein are novel aluminum alloy compositions and methods of making and processing the same. The alloys described herein exhibit high strength and can be used in automotive, transportation, electronics, and industrial applications.

BACKGROUND

High strength aluminum alloys are desirable for use in automotive structural applications. Aluminum alloys under the 6xxx series designation, for example, are primarily used for automotive structural applications. However, the current 6xxx series alloys are not capable of meeting the high strength demands of original equipment manufacturers (OEMs). For example, AA6111 and AA6013 type alloys achieve a yield strength of only 300 to 350 MPa in the T6 temper. To achieve the desired high strength in automotive structural applications, various steel grades are being used, such as boron steel. However, such steel grade sheets are unduly heavy and inappropriate for use in modern automotive designs requiring lightweight materials.

Specifically, government legislation has imposed mandatory mileage requirements for vehicles and has also lowered the allowable emissions from vehicle tail pipes. Thus, less dense materials are needed for automotive designs to meet these restrictions. Aluminum alloy, which is less dense than steel by a factor of 2.8, is being increasingly used in automotive manufacture because it offers substantial vehicle weight reduction. However, to achieve sufficient weight reduction and be an effective replacement for steel (and for other lower strength parts), the material must exhibit a yield strength of 500 MPa or more for a sheet gauge of about 2 mm.

The goal of a 500 MPa yield strength for a 2 mm aluminum alloy sheet is a significant challenge, even in the context of aerospace aluminum alloys which are known for their much higher strengths. This is partly due to the relationship between the thickness of parts and the attainable strength. Plates are generally greater than 10 mm thick. Typically, as the thickness of plate sections decreases, the strength correspondingly increases because of the faster quenching of the section from the solution heat treatment temperature. This helps in retaining higher supersaturation of alloying elements, which adds to the strength.

Below a thickness of approximately 100 to 150 mm, however, the microstructure of the plate changes from a generally unrecrystallized structure to a recrystallized structure. At this point, the strength begins to decrease. As the reduction continues into the sheet gauge, the strength reduction continues unabated, which makes thin sheets typically of much lower strength than plates of the same alloy. At the desired 2 mm gauge, the sheet is virtually completely recrystallized and can offer only a fraction of its strength capability as a plate gauge with an unrecrystallized structure.

A yield strength target of 500 MPa or higher is a challenge, even in plate gauge. Thus, achieving such a target is even more difficult to obtain for a 2 mm sheet gauge, as desired by automotive OEMs. Therefore, new, lightweight alloys that can meet the high-strength demands of OEMs are needed.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

Provided herein are novel 7xxx series aluminum alloys. The alloys exhibit high strength and can be used in a variety of applications, including automotive, transportation, electronics, and industrial applications. The aluminum alloys described herein comprise about 4-15 wt. % Zn, 0.1-3.5 wt. % Cu, 1.0-4.0 wt. % Mg, 0.05-0.50 wt. % Fe, 0.05-0.30 wt. % Si, 0.05-0.25 wt. % Zr, up to 0.25 wt. % Mn, up to 0.20 wt. % Cr, up to 0.15 wt. % Ti, and up to 0.15 wt. % of impurities, with the remainder as Al. Throughout this application, all elements are described in weight percentage (wt. %) based on the total weight of the alloy. In some cases, the aluminum alloy comprises about 5.6-9.3 wt. % Zn, 0.2-2.6 wt. % Cu, 1.4-2.8 wt. % Mg, 0.1-0.35 wt. % Fe, 0.05-0.2 wt. % Si, 0.05-0.15 wt. % Zr, 0.01-0.05 wt. % Mn, 0.01-0.05 wt. % Cr, 0.001-0.05 wt. % Ti, and up to 0.15 wt. % of impurities, with the remainder as Al. In some cases, the aluminum alloy comprises about 5.8-9.2 wt. % Zn, 0.3-2.5 wt. % Cu, 1.6 -2.6 wt. % Mg, 0.1-0.25 wt. % Fe, 0.07- 0.15 wt. % Si, 0.09-0.15 wt. % Zr, 0.02-0.05 wt. % Mn, 0.03-0.05 wt. % Cr, 0.003-0.035 wt. % Ti, and up to 0.15 wt. % of impurities, with the remainder as Al. In some cases, the aluminum alloy comprises about 8.9-9.2 wt. % Zn, 0.2 -2.1 wt. % Cu, 2.2-2.4 wt. % Mg, 0.18-0.23 wt. % Fe, 0.09-0.12 wt. % Si, 0.05-0.15 wt. % Zr, 0.04-0.09 wt. % Mn, 0.03-0.09 wt. % Cr, 0.01-0.02 wt. % Ti, and up to 0.15 wt. % of impurities, with the remainder as Al. In some cases, the aluminum alloy comprises about 9 wt. % Zn, 0.3 wt. % Cu, 2.3 wt. % Mg, 0.2 wt. % Fe, 0.1 wt. % Si, 0.1 wt. % Zr, 0.05 wt. % Mn, 0.04 wt. % Cr, 0.02 wt. % Ti, and up to 0.15 wt. % of impurities, with the remainder as Al. In some cases, the aluminum alloy comprises about 9.2 wt. % Zn, 1.2 wt. % Cu, 2.3 wt. % Mg, 0.23 wt. % Fe, 0.1 wt. % Si, 0.11 wt. % Zr, 0.04 wt. % Mn, 0.04 wt. % Cr, 0.01 wt. % Ti, and up to 0.15 wt. % of impurities, with the remainder as Al. In some cases, the aluminum alloy comprises about 9.2 wt. % Zn, 2.4 wt. % Cu, 1.9 wt. % Mg, 0.19 wt. % Fe, 0.08 wt. % Si, 0.1 wt. % Zr, 0.02 wt. % Mn, 0.03 wt. % Cr, 0.03 wt. % Ti, and up to 0.15 wt. % of impurities, with the remainder as Al. In some examples, the aluminum alloys can include up to 0.20% of one or more of Mo, Nb, Be, B, Co, Sn, Sr, V, In, Hf, Ag, Sc and Ni. In some examples, the aluminum alloys can include up to 0.10% of a rare earth element selected from the group consisting of Y, La, Ce, Pr, Nd, Pm, Sm, Eu, Gd, Tb, Dy, Ho, Er, Tm, Yb, and Lu.

Also provided herein are products comprising the aluminum alloys as described herein. The products can include a sheet, a plate, an extrusion, a casting, or a forging. In some examples, the product can have a maximum pit depth of less than about 40 microns. In some examples, the product can have an average pit depth of less than about 20 microns. In some cases, the product can have a yield strength of greater than about 550 MPa. In some cases, the product can have a yield strength of greater than about 600 MPa. In some examples, the product comprising the aluminum alloy can include an aluminum alloy having greater than about 0.30 wt % Cu (e.g., greater than about 0.80 wt % Cu or greater than about 1.1 wt % Cu), and the product has a yield strength of greater than about 600 MPa.

In some examples, the products can include automotive and/or transportation body parts, including motor vehicle body parts (e.g., bumpers, side beams, roof beams, cross beams, pillar reinforcements, inner panels, outer panels, side panels, hood inners, hood outers, and trunk lid panels). The products can also include electronic products, such as electronic device housings. The products can also include aerospace body parts, including a structural part (e.g., a wing, a fuselage, an aileron, a rudder, an elevator, a cowling or a support) or a non-structural part (e.g., a seat track, a seat frame, a panel or a hinge).

Further provided herein are methods of producing a metal product. The methods of producing the metal product include, but are not limited to, the steps of casting an aluminum alloy as described herein to form an ingot or a slab, homogenizing the ingot or the slab, hot rolling the ingot or the slab to produce a hot band of intermediate gauge, and cold rolling the hot band to a metal product of final gauge. Optionally, the metal product is a sheet. In these cases, the methods can further include a step of subjecting the sheet to a solution heat treatment at a temperature of from about 430° C. to about 600° C. (e.g., from about 430° C. to about 500° C., from about 440° C. to about 490° C., from about 450° C. to about 480° C., or from about 460° C. to about 475° C.). The methods can also include cooling the sheet to a temperature of from about 25° C. to about 120° C. In some cases, the cooling rate during the cooling step can optionally be from about 200° C. per second to about 600° C. per second. In other cases, the cooling rate during the cooling step is from about 2000° C. per second to about 3000° C. per second. The methods described herein can optionally comprise subjecting the sheet to an aging process. In some cases, the aging process can include heating the sheet to a temperature of from about 100° C. to about 170° C., maintaining the sheet at a temperature of from about 100° C. to about 140° C. for a period of time, and cooling the sheet to room temperature. In other cases, the aging process can include heating the sheet to a temperature of from about 100° C. to about 140° C.; maintaining the sheet at a temperature of from about 100° C. to about 140° C. for a period of time; heating the sheet to a temperature greater than about 140° C.; maintaining the sheet at a temperature greater than about 140° C. (e.g., between about 140° C. and 170° C.) for a period of time; and cooling the sheet to room temperature. In some cases, the sheet can be subjected to paint bake heat treatment, for example, heating the sheet to a temperature greater than about 140° C. (e.g., 150 ° C., 160° C., 170° C., 180° C., 190° C., 200° C., or higher) and maintaining the sheet at the temperature greater than about 140° C. (e.g., between about 150° C., 160° C., 170° C., 180° C., 190 ° C., 200° C., or higher) for a period of time (e.g., 10 minutes, 20 minutes, 30 minutes, 40 minutes, 50 minutes, 60 minutes, 70 minutes, 80 minutes, 90 minutes, 100 minutes, 110 minutes, or 120 minutes).

Alternatively, cold rolled F temper sheet blanks can be heated to a solution heat treatment temperature followed by hot forming into parts using cold dies. The cold dies can provide fast quench rates necessary to maintain the alloying elements in the solution for subsequent artificial aging response. Following the hot stamping and die quenching, the formed parts can be artificially aged as described above.

Also provided herein are aluminum sheets comprising a 7xxx series alloy prepared according to the methods described herein. The sheet can optionally be in the T1 through T9 temper. In some cases, the sheet can be in the T6 temper. In some cases, the sheet can be in the T7 temper. In some cases, the sheet has a yield strength of greater than about 500 MPa. In some cases, the aluminum sheets can comprise $Al_3Zr$ dispersoids. In some cases, the $Al_3Zr$ dispersoids can have a diameter of from about 5 nm to about 50 nm (e.g., from about 5 nm to about 20 nm, from about 8 nm to about 20 nm, or from about 5 nm to about 10 nm). In some cases, the $Al_3Zr$ dispersoids can have a diameter of less than about 20 nm (e.g., less than about 15 nm, less than about 10 nm, or less than about 8 nm). Further provided herein are aluminum plates, extrusions, castings, and forgings comprising a 7xxx series alloy as described herein.

Other objects and advantages of the invention will be apparent from the following detailed description of non-limiting examples of the invention.

BRIEF DESCRIPTION OF THE FIGURES

FIG. 1 is a graph showing the yield strengths of a comparative alloy and exemplary alloys described herein after solution heat treatment and aging under different conditions.

FIG. 2 is a graph showing the ultimate tensile strengths of a comparative alloy and exemplary alloys described herein after solution heat treatment and aging under different conditions.

DETAILED DESCRIPTION

Figure 3:
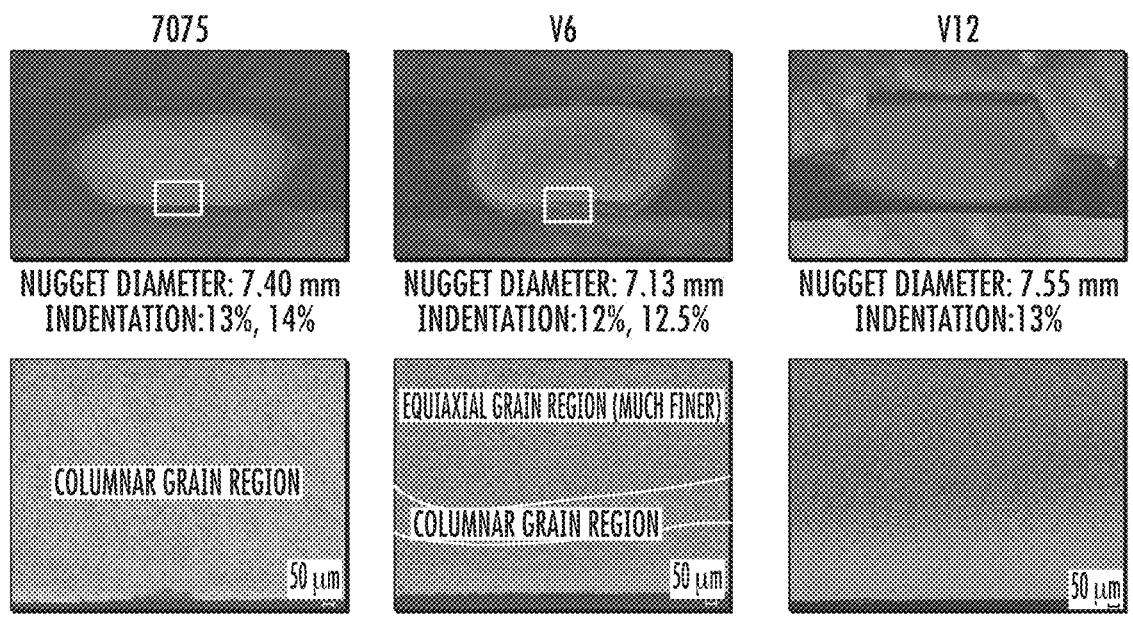
FIG. 3 contains pictures of resistance spot welding nuggets formed in an alloy 7075 sheet (top and bottom left panels), an alloy V6 sheet (top and bottom middle panels), and an alloy V12 sheet (top and bottom right panels).

Described herein are novel 7xxx series aluminum alloys. The alloys exhibit high strength in several tempers, particularly in the T6 temper. Surprisingly, alloys as described herein having a low copper (Cu) content (e.g., less than 0.5 wt. %) resulted in high yield strength and ultimate tensile strength values, and were comparable to or even surpassed the strengths of alloys containing higher amounts of Cu. This contrasts with the high strength 7xxx alloys used in aerospace applications, where the additional strength gains were achieved through the inclusion of Cu. In addition, the alloys described in some cases herein allow for the use of recycled metal, which results in cost saving advantages. Unexpectedly, some alloys described herein exhibit an unrecrystallized grain structure despite a 75% gauge reduction by cold rolling. The unrecrystallized grain structure contributes to the strength of the alloys.

Definitions and Descriptions:

The terms "invention," "the invention," "this invention" and "the present invention" used herein are intended to refer broadly to all of the subject matter of this patent application and the claims below. Statements containing these terms should be understood not to limit the subject matter described herein or to limit the meaning or scope of the patent claims below.

In this description, reference is made to alloys identified by AA numbers and other related designations, such as "series" or "7xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," and "the" includes singular and plural references unless the context clearly dictates otherwise.

In the following examples, the aluminum alloys are described in terms of their elemental composition in weight percent (wt. %). In each alloy, the remainder is aluminum, with a maximum wt. % of 0.15% for the sum of all impurities.

Unless other specified herein, room temperature refers to a temperature between about 20 ° C. to about 25° C., including 20° C., 21° C., 22° C., 23° C., 24° C., or 25° C.

Alloy Composition

The alloys described herein are novel 7xxx series aluminum alloys. The alloys exhibit unexpectedly high strength values in thin gauges (e.g., 10 mm or less), irrespective of whether the gauges have a normal recrystallized or an unrecrystallized microstructure. The properties of the alloys are achieved due to the compositions and methods of making the alloys. An alloy as described herein can have the following elemental composition as provided in Table 1.

TABLE 1

| Element | Weight Percentage (wt. %) |
| --- | --- |
| Zn | 4.0-15 |
| Cu | 0.1-3.5 |
| Mg | 1.0-4.0 |
| Fe | 0.05-0.5 |
| Si | 0.05-0.30 |
| Zr | 0.05-0.25 |
| Mn | 0-0.25 |
| Cr | 0-0.20 |
| Ti | 0-0.15 |
| Others | 0-0.05 (each) |
|  | 0-0.15 (total) |
| Al | Remainder |

In some examples, the alloy can have the following elemental composition as provided in Table 2.

TABLE 2

| Element | Weight Percentage (wt. %) |
| --- | --- |
| Zn | 5.6-9.3 |
| Cu | 0.2-2.6 |
| Mg | 1.4-2.8 |
| Fe | 0.1-0.35 |
| Si | 0.05-0.2 |
| Zr | 0.05-0.15 |
| Mn | 0.01-0.05 |
| Cr | 0.01-0.05 |
| Ti | 0.001-0.05 |
| Others | 0-0.05 (each) |
|  | 0-0.15 (total) |
| Al | Remainder |

In some examples, the alloy can have the following elemental composition as provided in Table 3.

TABLE 3

| Element | Weight Percentage (wt. %) |
| --- | --- |
| Zn | 5.8-9.2 |
| Cu | 0.3-2.5 |
| Mg | 1.6-2.6 |
| Fe | 0.1-0.25 |
| Si | 0.07-0.15 |
| Zr | 0.09-0.15 |
| Mn | 0.02-0.05 |
| Cr | 0.03-0.05 |
| Ti | 0.003-0.035 |
| Others | 0-0.05 (each) |
|  | 0-0.15 (total) |
| Al | Remainder |

In some examples, the alloys described herein include zinc (Zn) in an amount of from 4% to 15% (e.g., from 5.4% to 9.5%, from 5.6% to 9.3%, from 5.8% to 9.2%, or from 4.0% to 5.0%) based on the total weight of the alloy. For example, the alloy can include 4.0%, 4.1%, 4.2%, 4.3%, 4.4 %, 4.5%, 4.6 %, 4.7 %, 4.8 %, 4.9 %, 5.0 %, 5.1%, 5.2 %, 5.3%, 5.4 %, 5.5%, 5.6 %, 5.7 %, 5.8 %, 5.9 %, 6.0 %, 6.1 %, 6.2 %, 6.3 %, 6.4 %, 6.5 %, 6.6 %, 6.7 %, 6.8%, 6.9%, 7.0 %, 7.1%, 7.2 %, 7.3 %, 7.4 %, 7.5 %, 7.6 %, 7.7 %, 7.8 %, 7.9 %, 8.0 %, 8.1%, 8.2%, 8.3 %, 8.4 %, 8.5 %, 8.6 %, 8.7 %, 8.8 %, 8.9 %, 9.0 %, 9.1 %, 9.2 %, 9.3 %, 9.4 %, 9.5%, 9.6% 9.7%, 9.8%, 9.9 %, 10.0%, 10.1%, 10.2%, 10.3%, 10.4%, 10.5%, 10.6%, 10.7%, 10.8%, 10.9%, 11.0%, 11.1%, 11.2%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, 13.0%, 13.1%, 13.2 %, 13.3%, 13.4 %, 13.5%, 13.6 %, 13.7 %, 13.8%, 13.9 %, 14.0 %, 14.1%, 14.2%, 14.3%, 14.4%, 14.5%, 14.6%, 14.7%, 14.8%, 14.9%, or 15.0% Zn. All are expressed in wt. %.

In some examples, the alloys described include copper (Cu) in an amount of from 0.1% to 3.5% (e.g., from 0.2% to 2.6%, from 0.3% to 2.5%, or from 0.15% to 0.6%) based on the total weight of the alloy. For example, the alloy can include 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%, 0.27%, 0.28%, 0.29%, 0.3%, 0.35%, 0.4%, 0.45%, 0.5%, 0.55%, 0.6%, 0.65%, 0.7% 0.75%, 0.8%, 0.85%, 0.9%, 0.95%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, or 3.5% Cu. All are expressed in wt. %.

In some examples, the alloys described herein include magnesium (Mg) in an amount of from 1.0% to 4.0% (e.g., from 1.0% to 3.0%, from 1.4% to 2.8%, or from 1.6% to 2.6%). In some cases, the alloy can include 1.0%, 1.1%, 1.2%, 1.3%, 1.4%, 1.5%, 1.6%, 1.7%, 1.8%, 1.9 %, 2.0 %, 2.1 %, 2.2 %, 2.3 %, 2.4 %, 2.5 %, 2.6 %, 2.7 %, 2.8 %, 2.9 %, 3.0 %, 3.1%, 3.2%, 3.3%, 3.4%, 3.5%, 3.6%, 3.7%, 3.8%, 3.9%, or 4.0% Mg. All are expressed in wt.

Optionally, the combined content of Zn, Cu, and Mg can range from 5% to 14% (e.g., from 5.5% to 13.5%, from 6% to 13%, from 6.5% to 12.5%, or from 7% to 12%). For example, the combined content of Zn, Cu, and Mg can be 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, or 14 %. All are expressed in wt. %.

In some examples, the alloys described herein also include iron (Fe) in an amount of from 0.05% to 0.50% (e.g., from 0.10% to 0.35% or from 0.10% to 0.25%) based on the total weight of the alloy. For example, the alloy can include 0.05%, 0.06%, 0.07%, 0.08%, 0.09%, 0.10% 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, 0.40%, 0.41%, 0.42%, 0.43%, 0.44%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, or 0.50% Fe. All are expressed in wt. %.

In some examples, the alloys described herein include silicon (Si) in an amount of from 0.05% to 0.30% (e.g., from 0.05% to 0.25% or from 0.07% to 0.15%) based on the total weight of the alloy. For example, the alloy can include 0.05%, 0.06%, 0.07%, 0.08%, 0.09%, 0.10% 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27 %, 0.28%, 0.29%, or 0.30% Si. All are expressed in wt. %.

In some examples, the alloys described herein include zirconium (Zr) in an amount of from 0.05% to 0.25% (e.g., from 0.05% to 0.20% or from 0.09% to 0.15%) based on the total weight of the alloy. For example, the alloy can include 0.05%, 0.06%, 0.07%, 0.08%, 0.09%, 0.10%. 0.11%, 0.12%, 0.13%, 0.14%, 0.15%, 0.16%, 0.17%, 0.18%, 0.19%, 0.20%, 0.21%, 0.22%, 0.23%, 0.24%, or 0.25% Zr. In other examples, the alloys can include Zr in an amount less than 0.05% (e.g., 0.04%, 0.03%, 0.02%, or 0.01%) based on the total weight of the alloy. All are expressed in wt. %.

In some examples, the alloys described herein can include manganese (Mn) in an amount of up to 0.25% (e.g., from 0.01% to 0.10% or from 0.02% to 0.05%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, or 0.25% Mn. In some cases, Mn is not present in the alloy (i.e., 0%). All are expressed in wt. %.

In some examples, the alloys described herein include chromium (Cr) in an amount of up to 0.20% (e.g., from 0.01% to 0.10%, from 0.01% to 0.05%, or from 0.03% to 0.05%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, or 0.20% Cr. In some cases, Cr is not present in the alloy (i.e., 0%). All are expressed in wt. %.

In some examples, the alloys described herein include titanium (Ti) in an amount of up to 0.15% (e.g., from 0.001% to 0.10%, from 0.001% to 0.05%, or from 0.003% to 0.035%) based on the total weight of the alloy. For example, the alloy can include 0.001%, 0.002%, 0.003 %, 0.004 %, 0.005%, 0.006 %, 0.007 %, 0.008 %, 0.009 %, 0.010 %, 0.011% 0.012%, 0.013%, 0.014%, 0.015%, 0.016%, 0.017%, 0.018%, 0.019%, 0.020%, 0.021% 0.022%, 0.023%, 0.024%, 0.025%, 0.026%, 0.027%, 0.028%, 0.029%,0.03%, 0.031% 0.032%, 0.033%, 0.034%, 0.035%, 0.036%, 0.037%, 0.038%, 0.039%, 0.04%, 0.041% 0.042%, 0.043%, 0.044%, 0.045%, 0.046%, 0.047%, 0.048%, 0.049%, 0.05% , 0.055%, 0.06 %, 0.065 %, 0.07 %, 0.075 %, 0.08 %, 0.085 %, 0.09 %, 0.095 %, 0.1%, 0.11%, 0.12%, 0.13%, 0.14%, or 0.15% Ti. In some cases, Ti is not present in the alloy (i.e., 0%). All are expressed in wt. %.

In some examples, the alloys described herein can include one or more rare earth elements (i.e., one or more of Sc, Y, La, Ce, Pr, Nd, Pm, Sm, Eu, Gd, Tb, Dy, Ho, Er, Tm, Yb, and Lu) in an amount of up to 0.10% (e.g., from 0.01% to 0.10%, from 0.01% to 0.05%, or from 0.03% to 0.05%) based on the total weight of the alloy. For example, the alloy can include 0.01%, 0.02%, 0.03%, 0.04%, 0.05%, 0.06%, 0.07%, 0.08%, 0.09%, or 0.10% of the rare earth elements. All are expressed in wt. %.

In some examples, the alloys described herein can include one or more of Mo, Nb, Be, B, Co, Sn, Sr, V, In, Hf, Ag, and Ni in an amount of up to 0.20% (e.g., from 0.01% to 0.20% or from 0.05% to 0.15%) based on the total weight of the alloy. For example, the alloy can include 0.05 %, 0.06 %, 0.07 %, 0.08 %, 0.09 %, 0.10 %, 0.11 %, 0.12 %, 0.13 %, 0.14 %, 0.15%, 0.16%, 0.17%, 0.18%, 0.19%, or 0.20% of one or more of Mo, Nb, Be, B, Co, Sn, Sr, V, In, Hf, Ag, and Ni. All are expressed in wt. %.

Optionally, the alloy compositions described herein can further include other minor elements, sometimes referred to as impurities, in amounts of 0.05% or below, 0.04% or below, 0.03% or below, 0.02% or below, or 0.01% or below. These impurities may include, but are not limited to Ga, Ca, Bi, Na, Pb, or combinations thereof. Accordingly, Ga, Ca, Bi, Na, or Pb may be present in alloys in amounts of 0.05% or below, 0.04% or below, 0.03% or below, 0.02% or below, or 0.01% or below. The sum of all impurities does not exceed 0.15% (e.g., 0.10%). All expressed in wt. %. The remaining percentage of the alloy is aluminum.

Methods of Making

The alloys described herein can be cast using any casting process performed according to standards commonly used in the aluminum industry as known to one of ordinary skill in the art. For example, the alloys may be cast using a Continuous Casting (CC) process that may include, but is not limited to, the use of twin belt casters, twin roll casters, or block casters. In some examples, the casting process is performed by a CC process to form a billet, slab, shate, strip, or the like. In some examples, the casting process is performed by a Direct Chill (DC) casting process to form a cast ingot. In some examples, the molten alloy may be treated before casting. The treatment can include degassing, inline fluxing and filtering.

The cast ingot, billet, slab, or strip can then be subjected to further processing steps. Optionally, the processing steps can be used to prepare sheets. Such processing steps include, but are not limited to, a homogenization step, a hot rolling step, a cold rolling step, a solution heat treatment step, and optionally an artificial aging step. The processing steps are described below in relation to a cast ingot. However, the processing steps can also be used for a cast billet, slab or strip, using modifications as known to those of skill in the art.

In the homogenization step, an ingot prepared from an alloy composition as described herein is heated to attain a peak metal temperature of at least 450° C. (e.g., at least 455° C., at least 460° C., or at least 465° C.). In some cases, the ingot is heated to a temperature ranging from 450° C. to 480° C. The heating rate to the peak metal temperature can be 70° C./hour or less, 60° C./hour or less, or 50° C./hour or less. The ingot is then allowed to soak (i.e., held at the indicated temperature) for a period of time. In some cases, the ingot is allowed to soak for up to 15 hours (e.g., from 30 minutes to 15 hours, inclusively). For example, the ingot can be soaked at the temperature of at least 450° C. for 30 minutes, 1 hour, 2 hours, 3 hours, 4 hours, 5 hours, 6 hours, 7 hours, 8 hours, 9 hours, 10 hours, 11 hours, 12 hours, 13 hours, 14 hours, or 15 hours.

Optionally, the homogenization step described herein can be a two-stage homogenization process. In these cases, the homogenization process can include the above-described heating and soaking steps, which can be referred to as the first stage, and can further include a second stage. In the second stage of the homogenization process, the ingot temperature is increased to a temperature higher than the temperature used for the first stage of the homogenization process. The ingot temperature can be increased, for example, to a temperature at least five degrees Celsius higher than the ingot temperature during the first stage of the homogenization process. For example, the ingot temperature can be increased to a temperature of at least 455° C. (e.g., at least 460° C., at least 465° C., or at least 470° C.). The heating rate to the second stage homogenization temperature can be 5° C./hour or less, 3° C./hour or less, or 2.5° C./hour or less. The ingot is then allowed to soak for a period of time during the second stage. In some cases, the ingot is allowed to soak for up to 10 hours (e.g., from 30 minutes to 10 hours, inclusively). For example, the ingot can be soaked at the temperature of at least 455° C. for 30 minutes, 1 hour, 2 hours, 3 hours, 4 hours, 5 hours, 6 hours, 7 hours, 8 hours, 9 hours, or 10 hours. Following homogenization, the ingot can be allowed to cool to room temperature in the air.

At the end of the homogenization step, a hot rolling step is performed. The hot rolling step can include a hot reversing mill operation and/or a hot tandem mill operation. The hot rolling step can be performed at a temperature ranging from about 250° C. to about 550° C. (e.g., from about 300° C. to about 500° C. or from about 350° C. to about 450° C.). In the hot rolling step, the ingot can be hot rolled to a 12 mm thick gauge or less (e.g., from 3 mm to 8 mm thick gauge). For example, the ingot can be hot rolled to a 11 mm thick gauge or less, 10 mm thick gauge or less, 9 mm thick gauge or less, 8 mm thick gauge or less, 7 mm thick gauge or less, 6 mm thick gauge or less, 5 mm thick gauge or less, 4 mm thick gauge or less, or 3 mm thick gauge or less.

Following the hot rolling step, the rolled hot bands can be cold rolled to a sheet having a final gauge thickness of from 0.2 mm to 10 mm (e.g., 2 mm). For example, the rolled hot bands can be cold rolled to a final gauge thickness of 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, 2.6 mm, 2.7 mm, 2.8 mm, 2.9 mm, 3 mm, 3.1 mm, 3.2 mm, 3.3 mm, 3.4 mm, 3.5 mm, 3.6 mm, 3.7 mm, 3.8 mm, 3.9 mm, 4 mm, 4.1 mm, 4.2 mm, 4.3 mm, 4.4 mm, 4.5 mm, 4.6 mm, 4.7 mm, 4.8 mm, 4.9 mm, 5 mm, 5.1 mm, 5.2 mm, 5.3 mm, 5.4 mm, 5.5 mm, 5.6 mm, 5.7 mm, 5.8 mm, 5.9 mm, 6 mm, 6.1 mm, 6.2 mm, 6.3 mm, 6.4 mm, 6.5 mm, 6.6 mm, 6.7 mm, 6.8 mm, 6.9 mm, 7 mm, 7.1 mm, 7.2 mm, 7.3 mm, 7.4 mm, 7.5 mm, 7.6 mm, 7.7 mm, 7.8 mm, 7.9 mm, 8 mm, 8.1 mm, 8.2 mm, 8.3 mm, 8.4 mm, 8.5 mm, 8.6 mm, 8.7 mm, 8.8 mm, 8.9 mm, 9 mm, 9.1 mm, 9.2 mm, 9.3 mm, 9.4 mm, 9.5 9.6 mm, 9.7 mm, 9.8 mm, 9.9 mm, or 10 mm. The cold rolling can be performed to result in a sheet having a final gauge thickness that represents an overall gauge reduction by 20%, 50%, 75%, or 85%.

The cold rolled sheet can then undergo a solution heat treatment step. The solution heat treatment step can include heating the sheet from room temperature to a temperature of from about 430° C. to about 500° C. For example, the solution heat treatment step can include heating the sheet from room temperature to a temperature of from about 440° C. to about 490° C., from about 450° C. to about 480° C., or from about 460° C. to about 475° C.

In some examples, the heating rate for the solution heat treatment step can be from about 250° C./hour to about 350° C./hour (e.g., about 250° C./hour, about 255° C./hour, about 260 ° C./hour, about 265° C./hour, about 270° C./hour, about 275° C./hour, about 280° C./hour, about 285° C./hour, about 290° C./hour, about 295° C./hour, about 300° C./hour, about 305° C./hour, about 310° C./hour, about 315° C./hour, about 320° C./hour, about 325° C./hour, about 330 ° C./hour, about 335° C./hour, about 340° C./hour, about 345° C./hour, or about 350° C./hour).

Heating rates can be significantly higher, especially for sheets processed through a continuous solution heat treatment line. Heating rates in continuous heat treating lines can range from 5° C./second to 20° C./second (e.g., 5° C./second, 6° C./second, 7° C./second, 8° C./second, 9° C./second, 10° C./second, 11° C./second, 12° C./second, 13° C./second, 14° C./second, 15° C./second, 16° C./second, 17° C./second, 18° C./second, 19° C./second, or 20° C./second).

The sheet can soak at the temperature for a period of time. In some examples, the sheet is allowed to soak for up to 6 hours (e.g., from 10 minutes to 6 hours, inclusively). For example, the sheet can be soaked at the temperature of from about 430° C. to about 600° C. for 10 minutes, 20 minutes, 30 minutes, 40 minutes, 50 minutes, 1 hour, 2 hours, 3 hours, 4 hours, 5 hours, or 6 hours. For example, the sheet can be soaked at the temperature of from about 430° C. to about 500° C. for 10 minutes, 20 minutes, 30 minutes, 40 minutes, 50 minutes, 1 hour, 2 hours, 3 hours, 4 hours, 5 hours, or 6 hours.

In other examples, the heating rate for the solution heat treatment step can be from about 300° C./min to about 500° C./min (e.g., about 300° C./min, about 325° C./min, about 350° C./min, about 375° C./min, about 400° C./min, about 425° C./min, about 450° C./min, about 475° C./min, or about 500° C./min). In these cases, the sheet can soak at the temperature for a period from 5 seconds to 5 minutes, inclusively. For example, the sheet can be soaked at the temperature of from about 430° C. to about 500° C. for 10 seconds, 20 seconds, 30 seconds, 40 seconds, 50 seconds, 1 minute, 2 minutes, 3 minutes, 4 minutes, or 5 minutes.

The sheet can then be cooled to a temperature of from about 25° C. to about 120° C. in a quenching or cooling step. The quenching step can be performed using a rapid quenching practice or a slow quenching practice. The cooling rate in the rapid quenching practice can range from about 2000° C. per second to about 3000° C. per second (e.g., about 2500° C. per second). The cooling rate in the slow quenching practice can range from about 200° C. per second to about 600° C. per second (e.g., from about 300° C. per second to about 500° C. per second or from about 350° C. per second to about 450° C. per second). The quenching can be performed using liquid quenching, gas quenching, or a combination of these. In some cases, the quenching step is performed using water. In some cases, the quenching step is performed using forced air.

Optionally, the sheets can be quenched to room temperature. The sheets obtained after quenching are in the W temper. Such W temper sheets can have sufficient room temperature ductility suitable for forming parts. Therefore, the sheets quenched to room temperature can be used to form parts.

The solution heat treatment and quenching/cooling steps are performed in a manner such that soluble eutectic phases, such as the S-phase ($Al_2CuMg$) and M-phase [$Mg(Zn, Al, Cu)_2$ or $MgZn_2$], in the alloys are dissolved, which maximizes the strengthening effects of the solutes added to the alloys. In these cases, no undissolved $MgZn_2$, $Mg(Zn, Al, Cu)_2$, or $Al_2CuMg$ phases are observed in the solution heat treated sheets. The phases present in the solution heat treated sheets include the unavoidable, insoluble constituent particles of Fe-bearing phases (e.g., $Al_7Cu_2Fe$) and Si-bearing phases (e.g., $Mg_2Si$).

Optionally, the solution heat treated sheets can be aged. The artificial aging process develops the high strength and optimizes other desirable properties in the alloys. The mechanical properties of the final product are controlled by various aging conditions depending on the desired use. In some cases, the sheets described herein can be delivered to customers in a T4 temper, a T6 temper, a T7 temper, or a T8 temper, for example.

In some examples, the T6 temper is achieved using the following aging process. The sheet can be heated to a temperature of from about 100° C. to about 140° C. (e.g., from about 105° C. to about 135° C. or from about 110° C. to about 130° C.). The aging process can also include maintaining the sheet at a temperature of from about 100° C. to about 140° C. (e.g., from about 105° C. to about 135° C. or from about 110° C. to about 130° C.) for a period of time. The step of maintaining the sheet in the aging process can be performed for a period of from about 5 minutes to about 72 hours (e.g., from 30 minutes to 24 hours or from 1 hour to 10 hours). Optionally, the aging process can additionally include a step of further heating the sheet to a temperature of greater than about 140° C. (e.g., 145° C., 150° C., or 155° C.). The sheet can be maintained at the temperature of greater than about 140° C. (e.g., between about 140° C. and 180° C.) for a period of from about 5 minutes to about 72 hours (e.g., from 30 minutes to 24 hours or from 1 hour to 10 hours). The aging process can further include cooling the sheet to room temperature over a duration of from about 30 minutes to 48 hours.

Alternatively, cold rolled F temper sheet blanks can be heated to a solution heat treatment temperature followed by hot forming into parts using cold dies. The cold dies can provide fast quench rates necessary to maintain the alloying elements in the solution for subsequent artificial aging response. Following the hot stamping and die quenching, the formed parts can be artificially aged as described above.

The sheets prepared from the alloys described herein display exceptional yield strength. In some examples, the sheets have a yield strength of greater than about 500 MPa when the sheet is in the T6 temper. For example, the sheet can have a yield strength of 510 MPa or greater, 515 MPa or greater, 520 MPa or greater, 525 MPa or greater, 530 MPa or greater, or 535 MPa or greater when in the T6 temper.

The sheets prepared from the alloys described herein display high plastic strain ratios (referred to as r-value or Lankford value). In some examples, the sheets described herein display high r-values at an angle 45° to the rolling direction. For example, the r-value at an angle 45° to the rolling direction can be at least 0.75, at least 1.0, at least 1.25, at least 1.5, at least 1.75, at least 2.0, or at least 2.25. The high r-values demonstrate the anisotropic behavior of the sheets.

The alloys described herein can be used to make products in the form of plates, extrusions, castings, and forgings or other suitable products. The products can be made using techniques as known to those of ordinary skill in the art. For example, plates including the alloys as described herein can be prepared by processing a cast ingot in a homogenization step followed by a hot rolling step. In the hot rolling step, the ingot can be hot rolled to a 200 mm thick gauge or less (e.g., from 10 mm to 200 mm). For example, the ingot can be hot rolled to a plate having a final gauge thickness of 10 mm to 175 mm, 15 mm to 150 mm, 20 mm to 125 mm, 25 mm to 100 mm, 30 mm to 75 mm, or 35 mm to 50 mm.

The alloys and methods described herein can be used in automotive and/or transportation applications, including motor vehicle, aircraft, and railway applications, or any other desired application. In some examples, the alloys and methods can be used to prepare motor vehicle body part products, such as bumpers, side beams, roof beams, cross beams, pillar reinforcements (e.g., A-pillars, B-pillars, and C-pillars), inner panels, outer panels, side panels, inner hoods, outer hoods, or trunk lid panels. The aluminum alloys and methods described herein can also be used in aircraft or railway vehicle applications, to prepare, for example, external and internal panels.

The alloys and methods described herein can also be used in electronics applications. For example, the alloys and methods described herein can also be used to prepare housings for electronic devices, including mobile phones and tablet computers. In some examples, the alloys can be used to prepare housings for the outer casing of mobile phones (e.g., smart phones) and tablet bottom chassis.

In some cases, the alloys and methods described herein can be used in industrial applications. For example, the alloys and methods described herein can be used to prepare products for the general distribution market.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those of ordinary skill in the art without departing from the spirit of the invention.

EXAMPLE 1

Twelve alloys were prepared for strength and elongation testing (see Table 4). Alloys V1, V2, V3, V4, V5, V6, V7, V8, V9, V10, V11, and V12 were prepared according to the methods described herein. The elemental compositions of the tested alloys are shown in Table 4, with the balance being aluminum. The elemental compositions are provided in weight percentages. Alloy V3 is an existing AA7075 alloy and is used for comparative purposes. Alloys V1, V2, V4, V5, V6, V7, V8, V9, V10, V11, and V12 are prototype alloys prepared according to the methods described herein.

TABLE 4

| Alloy | Zn | Cu | Mg | Fe | Si | Zr | Mn | Cr | Ti |
|---|---|---|---|---|---|---|---|---|---|
| V1 | 8.03 | 2.07 | 1.68 | 0.13 | 0.07 | 0.10 | 0.04 | 0.03 | 0.003 |
| V2 | 8.20 | 2.31 | 1.79 | 0.30 | 0.20 | 0.12 | 0.03 | 0.03 | 0.028 |
| V3 | 5.43 | 1.47 | 2.48 | 0.19 | 0.09 | 0.003 | 0.02 | 0.17 | 0.005 |
| V4 | 5.94 | 1.68 | 2.57 | 0.19 | 0.09 | 0.12 | 0.03 | 0.04 | 0.02 |
| V5 | 6.77 | 2.18 | 2.45 | 0.10 | 0.09 | 0.12 | 0.03 | 0.04 | 0.004 |
| V6 | 8.98 | 0.30 | 2.31 | 0.20 | 0.10 | 0.10 | 0.05 | 0.04 | 0.02 |
| V7 | 5.74 | 0.31 | 1.49 | 0.20 | 0.11 | 0.10 | 0.03 | 0.03 | 0.01 |
| V8 | 8.05 | 1.85 | 1.80 | 0.19 | 0.11 | 0.10 | 0.04 | 0.04 | 0.01 |
| V9 | 8.20 | 1.81 | 2.16 | 0.20 | 0.11 | 0.11 | 0.04 | 0.04 | 0.01 |
| V10 | 8.29 | 2.16 | 1.77 | 0.18 | 0.10 | 0.11 | 0.04 | 0.05 | 0.01 |
| V11 | 8.07 | 2.34 | 1.96 | 0.19 | 0.07 | 0.10 | 0.04 | 0.03 | 0.014 |
| V12 | 9.18 | 2.42 | 1.93 | 0.19 | 0.08 | 0.13 | 0.02 | 0.03 | 0.031 |

All expressed in wt. %.

Ingots having the alloy composition shown above in Table 4 were homogenized according to the procedures described herein using the conditions recited in Table 5. Specifically, the ingots were heated to 460° C. or to 465° C. over 8 hours and then soaked for a period of time, as indicated in Table 5. The first heating and soaking is referred to as "Stage 1" in Table 5. Optionally, the ingots were further heated and soaked for a period of time in a second homogenization step, which is referred to as "Stage 2" in Table 5.

TABLE 5

| | Homogenization Conditions | | | | |
|---|---|---|---|---|---|
| Alloy | Stage 1 Homogenization Temperature (° C.) | Stage 1 Soak Time (hours) | Stage 2 Homogenization Temperature (° C.) | Stage 2 Heating Rate (° C./hour) | Stage 2 Soak Time (hours) |
| V1 | 462 | 12 | N/A | N/A | N/A |
| V2 | 462 | 12 | N/A | N/A | N/A |
| V3 | 465 | 4 | 477 | 3 | 2 |
| V4 | 465 | 4 | 477 | 3 | 2 |
| V5 | 465 | 4 | 477 | 3 | 4 |
| V6 | 465 | 6 | N/A | N/A | N/A |
| V7 | 460 | 6 | N/A | N/A | N/A |
| V8 | 460 | 6 | N/A | N/A | N/A |
| V9 | 460 | 6 | N/A | N/A | N/A |
| V10 | 460 | 6 | N/A | N/A | N/A |
| V11 | 462 | 12 | 467 | 2.5 | 4 |
| V12 | 462 | 12 | N/A | N/A | N/A |

The ingots were then hot rolled from an initial thickness of 65 mm to a final thickness of 8 mm, using 14 hot rolling passes. The laydown temperatures for the hot rolling step ranged from 400° C. to 425° C. and the exit temperatures ranged from 315° C. to 370° C. The hot bands were immediately placed in a furnace to simulate coil cooling. The hot bands were then cold rolled to a final gauge thickness of approximately 2 mm (overall gauge reduction by 75%). The cold rolled sheets were then heated to 465° C. at a rate of approximately 283° C. per hour and allowed to soak for 1 hour. The sheets were then cooled to room temperature (approximately 25° C.) in a quenching step by using cold water or warm water and then aged.

Specifically, alloys V4, V6, V7, V8, V9, and V10 were quenched using water at approximately 20° C. (referred to in this example as the "cold water quench" or "cold water quenching"). For the cold water quench, the sheet was cooled at a rate of approximately 2000° C. per second to 3000° C. per second. The alloys were then aged according to one of the conditions A1, A2, A3, A4, A5, A6, A7, A11, A12, A13, or A14 described below in Table 6.

TABLE 6

| Aging Practice | First Heating Temperature (° C.) | First Soak Time (hours) | Second Heating Temperature (° C.) | Heating Rate (° C./hour) | Second Soak Time (hours) | Total Aging Time (hours) |
|---|---|---|---|---|---|---|
| A1  | N/A | N/A | N/A | N/A | N/A | 0  |
| A2  | 120 | 0   | N/A | N/A | N/A | 5  |
| A3  | 120 | 6   | N/A | N/A | N/A | 11 |
| A4  | 120 | 6   | 155 | 11.7 | 0  | 14 |
| A5  | 120 | 6   | 155 | 11.7 | 10 | 24 |
| A6  | 120 | 6   | 155 | 11.7 | 18 | 32 |
| A7  | 120 | 6   | 155 | 11.7 | 26 | 40 |
| A11 | 120 | 6   | 166 | 15.4 | 0  | 14 |
| A12 | 120 | 6   | 166 | 15.4 | 10 | 24 |
| A13 | 120 | 6   | 166 | 15.4 | 18 | 32 |
| A14 | 120 | 6   | 166 | 15.4 | 26 | 40 |

The hardness values of the sheets prepared from alloys V4, V6, V7, V8, V9, and V10 after cold water quenching and aging according to a condition described in Table 6 were measured using the Rockwell Hardness Test. The data are provided below in Table 7.

TABLE 7

| Alloy | Hardness (Rockwell B) | | | | | | | | | | |
|---|---|---|---|---|---|---|---|---|---|---|---|
|  | A1 | A2 | A3 | A4 | A5 | A6 | A7 | A11 | A12 | A13 | A14 |
| V4  | 71 | 79 | 87 | 88 | 89 | 89 | 88 | 88 | 88 | 88 | 88 |
| V6  | 78 | 85 | 86 | 91 | 87 | 84 | 82 | 89 | 81 | 78 | 73 |
| V7  | 48 | 58 | 71 | 75 | 76 | 73 | 70 | 75 | 70 | 65 | 61 |
| V8  | 74 | 80 | 87 | 88 | 88 | 84 | 82 | 89 | 81 | 78 | 75 |
| V9  | 74 | 83 | 89 | 89 | 91 | 88 | 85 | 91 | 85 | 82 | 80 |
| V10 | 73 | 82 | 89 | 90 | 88 | 85 | 82 | 90 | 81 | 78 | 75 |

In addition, alloys V4, V6, V7, V8, V9, and V10 were quenched using warm water. For the warm water quench, the sheet was cooled at a rate of approximately 350° C. per second using water at approximately 95° C. The alloys were then aged according to one of the conditions D1, D2, D3, D4, D5, D6, or D7 described below in Table 8.

TABLE 8

| Aging Practice | First Heating Temperature (° C.) | First Soak Time (hours) | Second Heating Temperature (° C.) | Heating Rate (° C./hour) | Second Soak Time (hours) | Total Aging Time (hours) |
|---|---|---|---|---|---|---|
| D1 | N/A | N/A | N/A | N/A | N/A | 0  |
| D2 | 120 | 0   | N/A | N/A | N/A | 5  |
| D3 | 120 | 6   | N/A | N/A | N/A | 11 |
| D4 | 120 | 6   | 155 | 11.7 | 0  | 14 |
| D5 | 120 | 6   | 155 | 11.7 | 10 | 24 |
| D6 | 120 | 6   | 155 | 11.7 | 18 | 32 |
| D7 | 120 | 6   | 155 | 11.7 | 26 | 40 |

The hardness values of the sheets prepared from alloys V4, V6, V7, V8, V9, and V10 after warm water quenching and aging according to a condition described in Table 8 were measured using the Rockwell Hardness Test. The data are provided below in Table 9.

TABLE 9

| Alloy | Hardness (Rockwell B) | | | | | | |
|---|---|---|---|---|---|---|---|
|  | D1 | D2 | D3 | D4 | D5 | D6 | D7 |
| V4  | 72 | 80 | 87 | 88 | 89 | 89 | 88 |
| V6  | 79 | 85 | 91 | 91 | 87 | 83 | 87 |
| V7  | 49 | 53 | 71 | 75 | 76 | 73 | 71 |
| V8  | 71 | 81 | 87 | 88 | 88 | 86 | 82 |
| V9  | 75 | 80 | 89 | 87 | 90 | 89 | 88 |
| V10 | 73 | 82 | 88 | 90 | 89 | 86 | 83 |

The effects of cold water quenching and warm water quenching were compared using the data in Tables 7 and 9 above. Specifically, sheets prepared from the same alloy and according to the same aging conditions that varied by the quenching practice were compared. The sheet prepared from alloy V6, quenched using warm water, and aged according to practice D3 had a Rockwell B hardness value 5 points greater than the corresponding sheet that was quenched using cold water (i.e., the sheet prepared from alloy V6 and aged according to practice A3). Similarly, the sheet prepared from alloy V6, quenched using warm water, and aged according to practice D7 had a Rockwell B hardness value 5.1 points greater than the corresponding sheet that was quenched using cold water (i.e., the sheet prepared from alloy V6 and aged according to practice A7). Additionally, the sheet prepared from alloy V7, quenched using warm water, and aged according to practice D2 had a Rockwell B hardness value 5.5 points lower than the corresponding sheet that was quenched using cold water (i.e., the sheet prepared from alloy V7 and aged according to practice A2).

EXAMPLE 2

The sheets prepared using the warm water quench in Example 1 were aged according to the conditions described below in Table 10 (i.e., B1, B3, B4, B5, B6, B8, B10, B12, B14, and B16). Specifically, the sheets prepared from alloys V1, V2, V3, V5, V11, and V12 were aged according to each of the conditions recited for aging practices B1, B3, B4, B5, and B6. The sheets prepared from alloys V4, V6, V7, V8, V9, and V10 were aged according to each of the conditions recited for aging practices B8, B10, B12, B14, and B16. As described in Table 10, the sheets were heated from room temperature (about 25° C.) to about 120° C. at a rate of 16 ° C./hour. The sheets were then maintained at about 120° C. for 6 hours. The sheets aged according to aging practices B4, B5, B6, B12, B14, and B16 were further heated from 120° C. to 155° C. at a rate of 11.7° C./hour. The sheets were maintained at about 155° C. for the period of time indicated as "Second Soak Time" in Table 10. The sheets were then cooled to room temperature (about 25° C.). The time lapsed from the start of the aging practice to the end of the aging practice is indicated in Table 10 as total aging time.

TABLE 10

| | Aging Conditions | | | | | |
|---|---|---|---|---|---|---|
| Aging Practice | First Heating Temperature (° C.) | First Soak Time (hours) | Second Heating Temperature (° C.) | Heating Rate (° C./hour) | Second Soak Time (hours) | Total Aging Time (hours) |
| B1 | N/A | N/A | N/A | N/A | N/A | 0 |
| B3 | 120 | 6 | N/A | N/A | N/A | 11 |
| B4 | 120 | 6 | 155 | 11.7 | 0 | 14 |
| B5 | 120 | 6 | 155 | 11.7 | 8 | 22 |
| B6 | 120 | 6 | 155 | 11.7 | 12 | 26 |
| B8 | N/A | N/A | N/A | N/A | N/A | 0 |
| B10 | 120 | 6 | N/A | N/A | N/A | 11 |
| B12 | 120 | 6 | 155 | 11.7 | 0 | 14 |
| B14 | 120 | 6 | 155 | 11.7 | 10 | 24 |
| B16 | 120 | 6 | 155 | 11.7 | 14 | 28 |

The yield strength (YS), ultimate tensile strength (UTS), percent uniform elongation (UE), percent total elongation (TE), and percent critical fracture strain (CFS) data were obtained for the sheets prepared from alloys V1, V2, V3, V5, V11, and V12 aged according to each of aging practices B1, B3, B4, B5, and B6, and for the sheets prepared from alloys V4, V6, V7, V8, V9, and V10 aged according to each of aging practices B8, B10, B12, B14, and B16. The tensile testing was performed at room temperature using an INSTRON test machine (Instron; Norwood, MA) according to test methods ASTM B557 and ASTM E8-11. The strain hardening exponent (n-value) and Lankford value (r-value) data were also obtained. The properties were measured in the longitudinal (L) direction. The data are listed in tabular form in Table 11. The yield strength data and ultimate tensile data are also depicted in FIG. 1 and FIG. 2, respectively.

TABLE 11

| Alloy | Aging Variant | YS (MPa) | UTS (MPa) | UE (%) | TE (%) | CFS (%) | n-Value | r-Value |
|---|---|---|---|---|---|---|---|---|
| V1 | B1 | 304.8 | 463.9 | 20.2 | 21.3 | 12.6 | 0.26 | 0.60 |
| | B3 | 473.2 | 539.9 | 15.4 | 19.6 | 13.1 | 0.14 | 0.58 |
| | B4 | 517.8 | 544.9 | 8.8 | 13.8 | 12.5 | — | — |
| | B5 | 509.4 | 526.3 | 7.6 | 12.8 | 16.5 | — | — |
| | B6 | 489.5 | 513.8 | 8.2 | 13.7 | 18.4 | — | — |
| V2 | B1 | 332.8 | 497.1 | 20.3 | 21.7 | 12.4 | 0.24 | 0.49 |
| | B3 | 489.9 | 569.4 | 14.0 | 17.5 | 10.1 | 0.14 | 0.50 |
| | B4 | 523.9 | 575.4 | 11.3 | 14.6 | 9.6 | 0.11 | — |
| | B5 | 533.9 | 555.9 | 7.9 | 12.7 | 10.7 | — | — |
| | B6 | 504.3 | 532.7 | 7.8 | 12.0 | 11.7 | — | — |
| V3 | B1 | 263.4 | 450.1 | 19.8 | 20.7 | 15.7 | 0.25 | 0.59 |
| | B3 | 414.0 | 508.3 | 15.6 | 18.7 | 13.7 | 0.16 | 0.57 |
| | B4 | 437.4 | 508.7 | 13.1 | 16.0 | 13.4 | 0.14 | 0.58 |
| | B5 | 456.9 | 512.5 | 10.6 | 14.1 | 14.6 | — | — |
| | B6 | 456.8 | 511.0 | 10.2 | 14.1 | 14.4 | — | — |
| V4 | B8 | 292.4 | 453.7 | 17.5 | 23.7 | 15.7 | 0.25 | 0.62 |
| | B10 | 465.4 | 542.0 | 14.9 | 17.5 | 13.5 | 0.15 | 0.55 |
| | B12 | 480.8 | 542.0 | 13.5 | 16.6 | 13.8 | 0.13 | 0.59 |
| | B14 | 517.1 | 551.4 | 7.7 | 11.4 | 13.9 | — | — |
| | B16 | 519.4 | 552.5 | 8.3 | 12.4 | 16.0 | — | — |
| V5 | B1 | 324.4 | 478.4 | 19.6 | 21.3 | 13.6 | 0.25 | 0.52 |
| | B3 | 478.3 | 549.7 | 14.3 | 16.6 | 11.0 | 0.14 | 0.55 |
| | B4 | 504.4 | 552.0 | 11.1 | 14.5 | 11.6 | 0.11 | — |
| | B5 | 541.0 | 566.2 | 7.7 | 11.6 | 12.1 | — | — |
| | B6 | 534.5 | 563.2 | 7.4 | 10.7 | 13.4 | — | — |
| V6 | B8 | 396.2 | 574.3 | 16.9 | 16.8 | 8.8 | 0.23 | 0.35 |
| | B10 | 591.6 | 645.5 | 11.2 | 13.6 | 6.6 | 0.11 | 0.48 |
| | B12 | 595.1 | 624.5 | 9.7 | 13.1 | 7.6 | — | — |
| | B14 | 528.2 | 549.0 | 6.3 | 11.9 | 14.0 | — | — |
| | B16 | 511.7 | 534.2 | 6.5 | 12.0 | 14.3 | — | — |
| V7 | B8 | 230.8 | 364.7 | 15.1 | 15.3 | 10.9 | 0.23 | 0.45 |
| | B10 | 361.5 | 438.7 | 13.2 | 14.7 | 10.2 | 0.15 | 0.48 |
| | B12 | 397.5 | 451.6 | 11.3 | 13.8 | 10.8 | 0.12 | 0.50 |
| | B14 | 409.4 | 442.5 | 8.4 | 12.0 | 14.8 | — | — |
| | B16 | 402.1 | 436.2 | 6.5 | 12.5 | 18.9 | — | — |
| V8 | B8 | 309.2 | 464.7 | 18.3 | 21.5 | 12.7 | 0.25 | 0.59 |
| | B10 | 471.8 | 542.3 | 15.2 | 17.8 | 11.1 | 0.14 | 0.66 |
| | B12 | 500.8 | 546.2 | 11.0 | 14.7 | 10.3 | 0.11 | — |
| | B14 | 516.7 | 533.9 | 6.7 | 11.5 | 14.3 | — | — |
| | B16 | 495.9 | 520.6 | 7.4 | 12.5 | 16.9 | — | — |
| V9 | B8 | 334.4 | 488.5 | 17.4 | 18.9 | 10.8 | 0.22 | 0.52 |
| | B10 | 501.0 | 570.3 | 14.0 | 16.0 | 9.8 | 0.14 | 0.53 |
| | B12 | 513.8 | 566.6 | 12.0 | 15.4 | 10.1 | 0.12 | 0.47 |
| | B14 | 548.7 | 563.1 | 5.8 | 9.2 | 12.6 | — | — |
| | B16 | 531.3 | 550.7 | 6.8 | 10.8 | 13.2 | — | — |
| V10 | B8 | 328.9 | 484.4 | 17.7 | 19.1 | 10.5 | 0.24 | 0.61 |
| | B10 | 494.1 | 564.6 | 13.8 | 16.7 | 10.3 | 0.14 | 0.54 |

TABLE 11-continued

| Alloy | Aging Variant | YS (MPa) | UTS (MPa) | UE (%) | TE (%) | CFS (%) | n-Value | r-Value |
|---|---|---|---|---|---|---|---|---|
| | B12 | 529.6 | 571.3 | 10.2 | 13.7 | 9.8 | 0.14 | — |
| | B14 | 529.1 | 547.5 | 7.3 | 10.9 | 12.0 | — | — |
| | B16 | 514.4 | 538.2 | 7.5 | 11.8 | 13.7 | — | — |
| V11 | B1 | 318.3 | 477.9 | 20.8 | 22.3 | 13.7 | 0.25 | 0.48 |
| | B3 | 483.0 | 558.3 | 14.9 | 18.2 | 12.3 | 0.14 | 0.52 |
| | B4 | 510.6 | 561.7 | 11.3 | 14.6 | 10.8 | 0.11 | — |
| | B5 | 542.4 | 557.0 | 6.9 | 13.0 | 14.4 | — | — |
| | B6 | 519.9 | 542.3 | 7.5 | 12.1 | 15.5 | — | — |
| V12 | B1 | 400.5 | 578.7 | 20.1 | 21.7 | 11.1 | 0.23 | 0.42 |
| | B3 | 543.3 | 644.7 | 14.1 | 17.8 | 8.9 | 0.14 | 0.42 |
| | B4 | 584.2 | 643.6 | 11.4 | 15.0 | 8.5 | 0.11 | 0.54 |
| | B5 | 598.5 | 618.9 | 7.6 | 11.5 | 9.2 | — | — |
| | B6 | 562.3 | 591.2 | 7.5 | 11.8 | 10.7 | — | — |

As shown in Table 11, significant strength increases were obtained for the sheets prepared from alloys V1, V2, V4, V5, V6, V7, V8, V9, V10, V11, and V12 as compared to the sheet prepared from alloy V3 (i.e., the AA7075 alloy used for comparative purposes).

The highest attained yield strengths for the sheets prepared from alloys V1-V12 according to one of the above-described aging practices (i.e., the peak age yield strengths) are listed in Table 12 under the heading "Peak Age Yield Strength." The change in yield strength as compared to the yield strength of the sheet prepared from comparative alloy AA7075 (i.e., V3) is also shown in Table 12. The corresponding percent total elongation (T. Elong), percent uniform elongation (U. Elong), and percent critical fracture strain (CFS) values are reproduced in Table 12.

TABLE 12

| | Peak Age Yield Strength (MPa) | Yield Strength Change over Comparative Sheet (MPa) | Total Elongation (%) | Uniform Elongation (%) | Critical Fracture Strain (%) |
|---|---|---|---|---|---|
| V1 | 518 | Increased by 61 | 13.8 | 8.8 | 12.5 |
| V2 | 534 | Increased by 77 | 12.7 | 7.9 | 10.7 |
| V3 | 457 | N/A | 14.1 | 10.6 | 14.6 |
| V4 | 517 | Increased by 60 | 11.4 | 7.7 | 13.9 |
| V5 | 541 | Increased by 84 | 11.6 | 7.7 | 12.1 |
| V6 | 592 | Increased by 135 | 13.6 | 11.2 | 6.6 |
| V7 | 409 | Decreased by 48 | 12.0 | 8.4 | 14.8 |
| V8 | 517 | Increased by 60 | 11.5 | 6.7 | 14.3 |
| V9 | 549 | Increased by 92 | 9.2 | 5.8 | 12.6 |
| V10 | 530 | Increased by 73 | 13.7 | 10.2 | 9.8 |
| V11 | 542 | Increased by 85 | 13.0 | 6.9 | 14.4 |
| V12 | 599 | Increased by 142 | 11.5 | 7.6 | 9.2 |

EXAMPLE 3

The sheets prepared from alloys V1 through V12 were aged by heating to a temperature of 125° C. for 24 hours. The resulting yield strengths were measured and the results are shown in Table 13 below. For comparative purposes, the peak age yield strengths are also listed in Table 13.

TABLE 13

| | Peak Age Yield Strength (MPa) | Yield Strength (MPa) after aging for 24 hours at 125° C. |
|---|---|---|
| V1 | 518 | 520 |
| V2 | 534 | 537 |
| V3 | 457 | 434 |
| V4 | 517 | 503 |
| V5 | 541 | 513 |
| V6 | 592 | 624 |
| V7 | 409 | 420 |
| V8 | 517 | 523 |
| V9 | 549 | 540 |
| V10 | 530 | 541 |
| V11 | 542 | 535 |
| V12 | 599 | 579 |

The strength data obtained after aging for 24 hours at 125° C. ("the 125° C. data") show considerable variability as compared to the peak age strength data. For example, the V6 sample displayed a significant increase in yield strength for the 125° C. data as compared to the peak age strength data. The V5 sample, however, showed a significant decrease in yield strength for the 125° C. data as compared to the peak age strength data. Other samples also varied by producing higher or lower yield strengths for the 125° C. data as compared to the peak age strength data. These variations arise from the different aging kinetics of the individual alloys. Not to be bound by theory, the relative lower values obtained after aging at 125° C. for 24 hours may have arisen from an underaging effect.

EXAMPLE 4

The tensile properties of alloys V6 and V12 were also measured in the transverse (T) direction according to test methods ASTM B557 and ASTM E8-11. Table 14 below shows the yield strength, ultimate tensile strength, percent uniform elongation, percent tensile elongation, and critical fracture strain for sheets prepared from alloys V6 and V12 in the T direction. For comparative purposes, the data values from Table 11 are reproduced for the sheets prepared from alloys V6 and V12 in the longitudinal (L) direction.

TABLE 14

| Alloy | Direction | Aging Variant | YS (MPa) | UTS (MPa) | UE (%) | TE (%) | CFS | n-value | r-value |
|---|---|---|---|---|---|---|---|---|---|
| V6 | T | B8 | 376.3 | 514.7 | 20.3 | 22.5 | 12.5 | 0.22 | 0.93 |
| | | B10 | 551.3 | 587.9 | 10.8 | 14.7 | 9.6 | — | — |
| | | B12 | 554.2 | 572.4 | 7.8 | 12.8 | 9.9 | — | — |
| V12 | T | B1 | 385.9 | 533.1 | 21.0 | 23.6 | 13.2 | 0.23 | 0.87 |
| | | B4 | 566.8 | 605.2 | 10.0 | 14.1 | 9.8 | — | — |
| | | B5 | 572.9 | 587.7 | 6.5 | 11.1 | 10.4 | — | — |
| V6 | L | B8 | 396.2 | 574.3 | 16.9 | 16.8 | 8.8 | 0.23 | 0.35 |
| | | B10 | 591.6 | 645.5 | 11.2 | 13.6 | 6.6 | 0.11 | 0.48 |
| | | B12 | 595.1 | 624.5 | 9.7 | 13.1 | 7.6 | — | — |

TABLE 14-continued

| Alloy | Direction | Aging Variant | YS (MPa) | UTS (MPa) | UE (%) | TE (%) | CFS | n-value | r-value |
|---|---|---|---|---|---|---|---|---|---|
| V12 | L | B1 | 400.5 | 578.7 | 20.1 | 21.7 | 11.1 | 0.23 | 0.42 |
|  |  | B4 | 584.2 | 643.6 | 11.4 | 15.0 | 8.5 | 0.11 | 0.54 |
|  |  | B5 | 598.5 | 618.9 | 7.6 | 11.5 | 9.2 | — | — |

EXAMPLE 5

Resistance spot welding was performed on sheets prepared from alloy 7075, alloy V6, and alloy V12 using the same parameters. See FIG. 3. Specifically, a pair of opposing welding electrodes was brought into contact with opposite sides of sheet metal layers at diametrically common spots. An electrical current was then sent through the sheet metal layers which resulted in the forming of a molten weld pool. The current flow was stopped and the molten weld pool solidified into a weld nugget. The nuggets formed from the welding in each of the sheets had similar diameters and indentations. As shown in FIG. 3, alloys V6 and V12 had much less columnar grain region in the weld than alloy 7075. Therefore, alloys V6 and V12 were more crack resistant than alloy 7075, because most cracks form along the grain boundaries of the columnar grain region.

EXAMPLE 6

Figure 4:
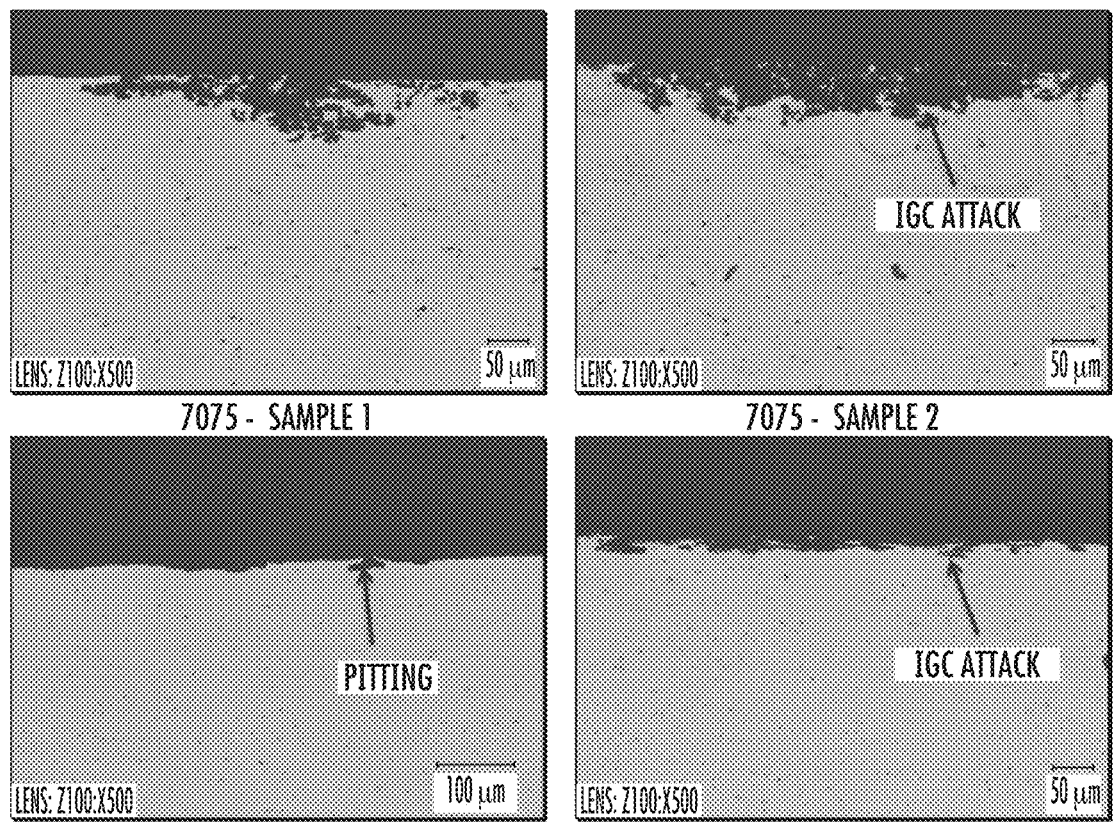
FIG. 4 contains pictures of cross sections of sheets prepared from alloy 7075 (Sample 1 and 2), alloy V6, and alloy V12 after being immersed in a solution containing 57 g/L NaCl and 10 mL $H_2O_2$ for 24 hours.

Corrosion testing was performed for alloy 7075 (two samples), alloy V6, and alloy V12. The sheets were immersed in a solution containing 57 g/L NaCl and 10 mL $H_2O_2$ for 24 hours. As shown in FIG. 4, the alloys exhibit different types and degrees of corrosion attack. After the 24 hour immersion period, the V6 sample exhibited the highest resistance to intergranular corrosion (IGC). Instead of IGC, a pitting morphology was observed in alloy V6. See FIG. 4.

The V12 sample showed some degree of IGC, but the severity was much less than the alloy 7075 samples. See FIG. 4. In the 7075 samples, considerable intergranular attack and penetration in the bulk metal was observed, which demonstrates that these samples provide the least amount of resistance to IGC amongst the samples claimed.

Figure 5:
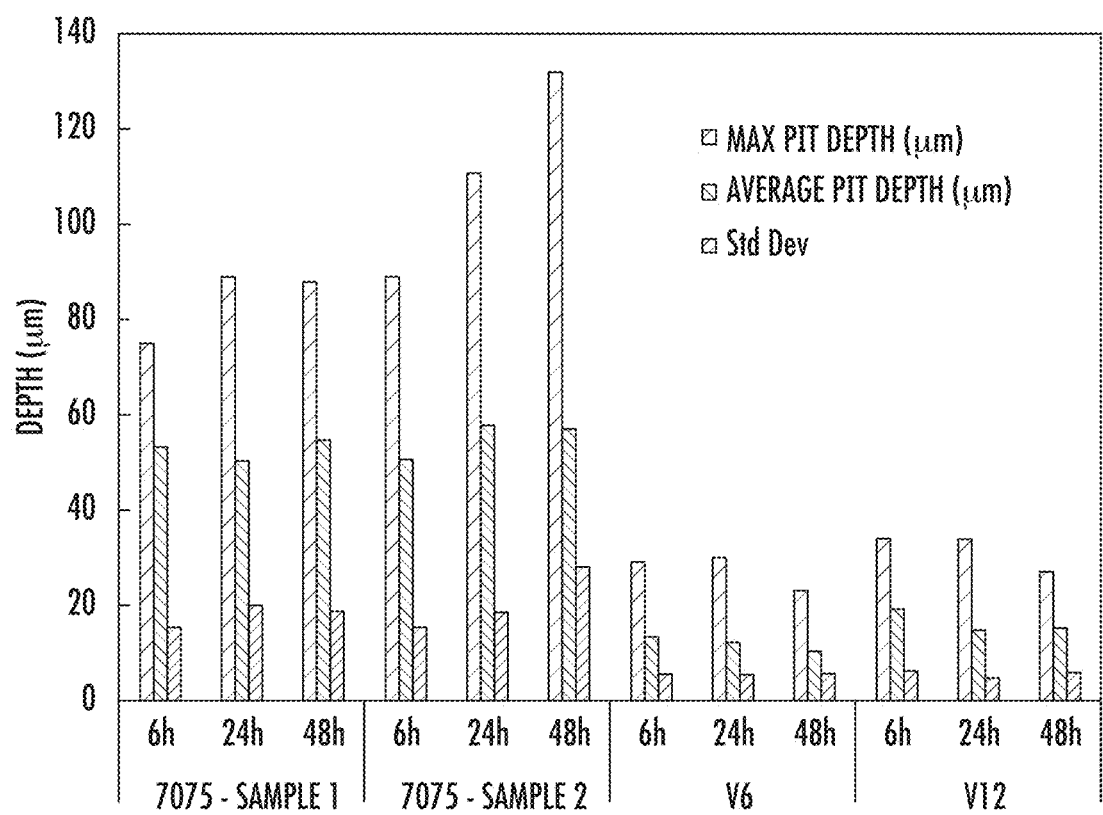
FIG. 5 is a graph of the average and maximum pit depths in sheets prepared from alloy 7075 (Sample 1 and 2), alloy V6, and alloy V12 after being immersed in a solution containing 57 g/L NaCl and 10 mL $H_2O_2$ for 24 hours.
Figure 6:
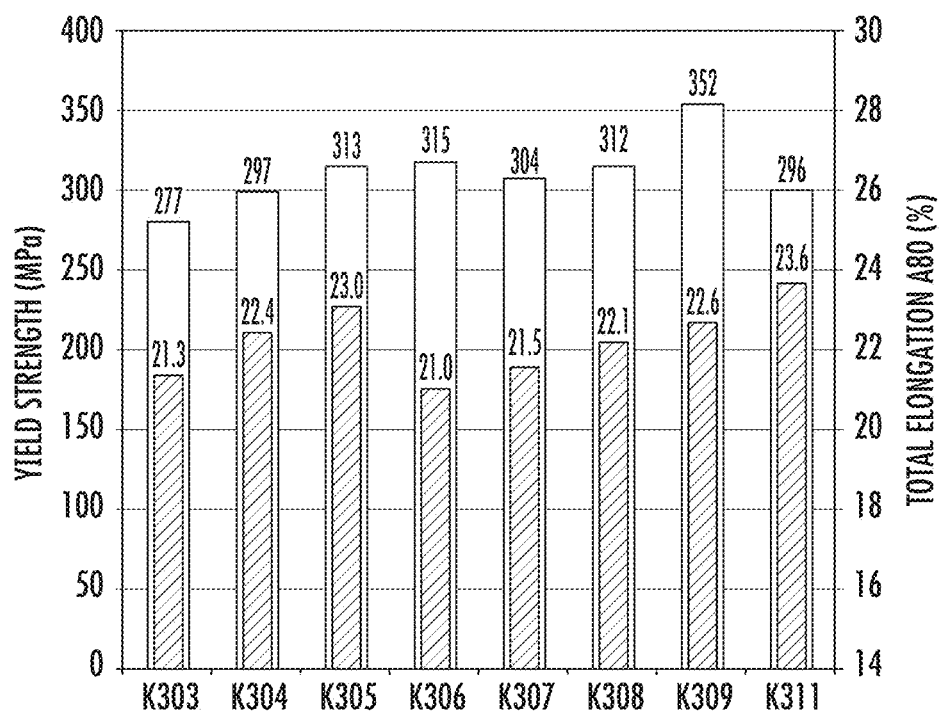
FIG. 6 is a graph showing the yield strength and total elongation of alloys K303, K304, K305, K306, K307, K308, K309, and K311 in the T4 temper obtained by holding the sheets at room temperature for 10 days after water quenching from the solution heat treatment temperature.
Figure 7:
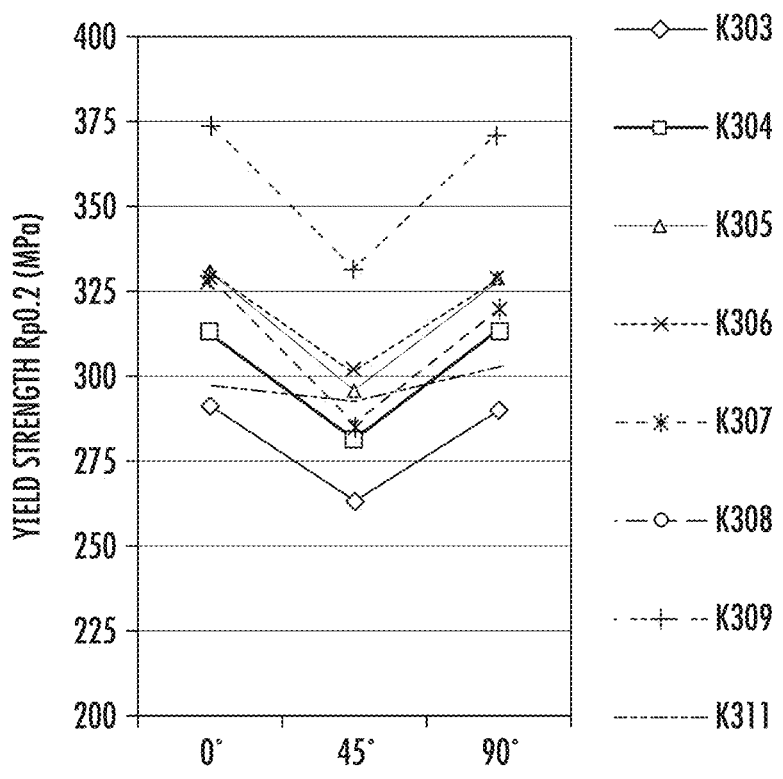
FIG. 7 is a graph showing the yield strength of alloys K303, K304, K305, K306, K307, K308, K309, and K311 in the T4 temper (obtained by holding the sheets at room temperature for 10 days after water quenching from the solution heat treatment temperature) at angles 0°, 45°, and 90° to the rolling direction.
Figure 8:
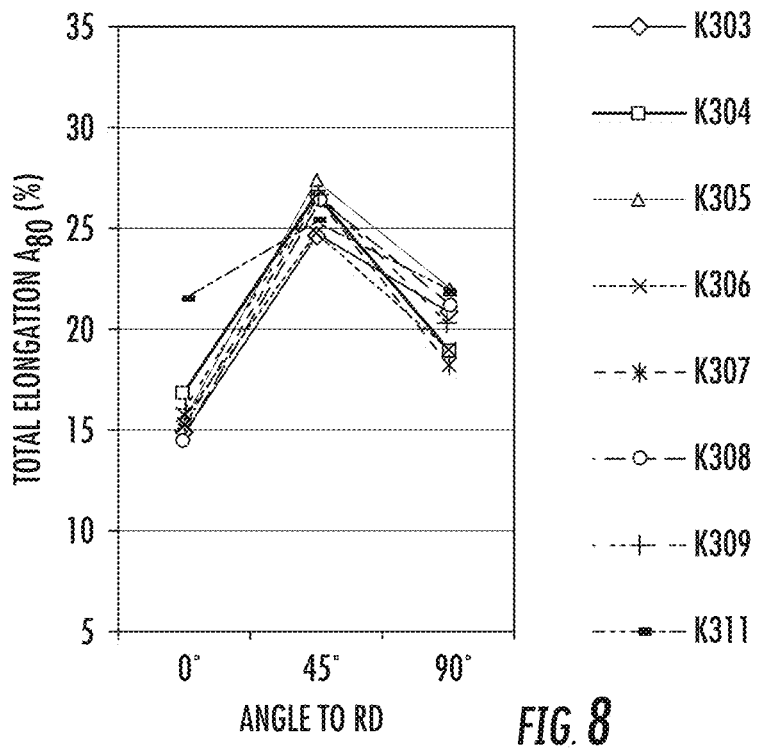
FIG. 8 is a graph showing the total elongation of alloys K303, K304, K305, K306, K307, K308, K309, and K311 in the T4 temper (obtained by holding the sheets at room temperature for 10 days after water quenching from the solution heat treatment temperature) at angles 0°, 45°, and 90° to the rolling direction.
Figure 9:
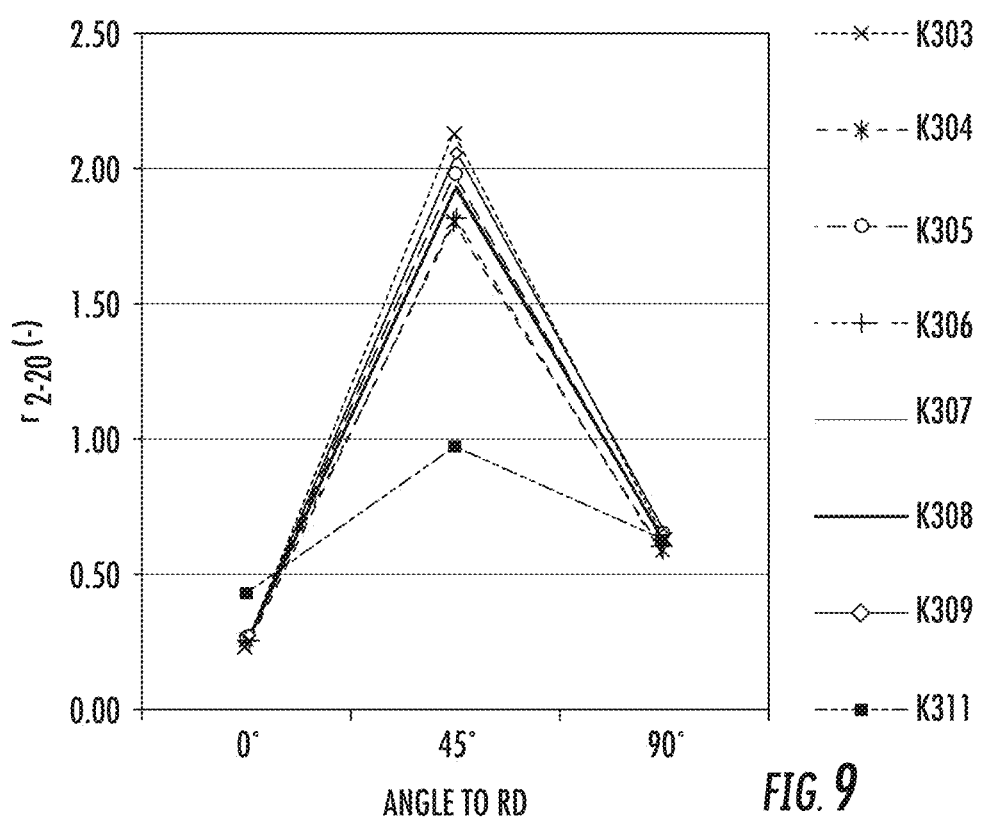
FIG. 9 is a graph showing the r values of alloys K303, K304, K305, K306, K307, K308, K309, and K311 in the T4 temper (obtained by holding the sheets at room temperature for 10 days after water quenching from the solution heat treatment temperature) at angles 0°, 45°, and 90° to the rolling direction.

The pit depths of the samples were measured using an optical microscope. The V6 samples consistently showed the lowest average pit depth over all selected immersion intervals, including at 6 hours, 24 hours, and 48 hours. The average pit depth was lower than 20 microns and the maximum pit depth was less than 40 microns. See FIG. 5.

Compared to the V6 samples, the V12 samples showed slight susceptibility to IGC. However, the severity was much lower than in the 7075 alloys, which showed average pit depth values greater than 40 microns and a maximum pit depth ranging from 75 microns to approximately 135 microns. See FIG. 5.

As noted above, V6 is a low copper variant whereas V12 contains a higher amount of copper. Surprisingly, both the low copper variant and higher copper variant exhibited lower corrosion depth of attack than the baseline alloy 7075.

EXAMPLE 7

Eight alloys were prepared for strength and elongation testing (see Table 15). Alloys K303 K304, K305, K306, K307, K308, K309, and K311 were prepared according to the methods described herein. The elemental compositions of the tested alloys are shown in Table 15, with the balance being aluminum. The elemental compositions are provided in weight percentages. Each of the alloys were prepared according to the methods described herein.

TABLE 15

| Alloy | Si | Fe | Cu | Mn | Mg | Cr | Zn | Ti | Zr |
|---|---|---|---|---|---|---|---|---|---|
| K303 | 0.10 | 0.14 | 0.14 | 0.01 | 1.56 | 0.00 | 5.45 | 0.02 | 0.16 |
| K304 | 0.09 | 0.14 | 0.15 | 0.01 | 1.31 | 0.00 | 6.14 | 0.02 | 0.15 |
| K305 | 0.08 | 0.16 | 0.14 | 0.01 | 1.13 | 0.00 | 6.74 | 0.02 | 0.13 |
| K306 | 0.09 | 0.14 | 0.14 | 0.01 | 2.08 | 0.00 | 6.30 | 0.03 | 0.14 |
| K307 | 0.09 | 0.16 | 0.13 | 0.02 | 1.69 | 0.01 | 6.44 | 0.03 | 0.12 |
| K308 | 0.09 | 0.14 | 0.15 | 0.01 | 1.48 | 0.00 | 7.82 | 0.03 | 0.14 |
| K309 | 0.08 | 0.15 | 0.14 | 0.01 | 1.43 | 0.00 | 8.54 | 0.02 | 0.14 |
| K310 | 0.11 | 0.16 | 0.13 | 0.00 | 1.35 | 0.00 | 10.00 | 0.025 | 0.14 |
| K311 | 0.08 | 0.14 | 1.73 | 0.00 | 2.42 | 0.00 | 5.72 | 0.02 | 0.08 |
| K312 | 0.11 | 0.14 | 1.16 | 0.00 | 1.72 | 0.00 | 7.09 | 0.03 | 0.11 |
| K313 | 0.08 | 0.12 | 1.75 | 0.01 | 1.77 | 0.00 | 6.87 | 0.03 | 0.10 |
| K314 | 0.12 | 0.12 | 1.87 | 0.00 | 1.54 | 0.00 | 7.51 | 0.03 | 0.08 |

All expressed in wt %.

Ingots having the alloy composition shown above in Table 15 were homogenized by heating to about 460° C. at a heating rate of about 30° C./hour. The ingots were allowed to soak for six hours. The ingots were then hot rolled to a final thickness of 10 mm, using 10-11 hot rolling passes. The exit temperatures for the hot rolling step ranged from 370° C. to 380° C. The hot bands were immediately placed in a furnace to simulate coil cooling. The hot bands were then cold rolled to a final gauge thickness of approximately 1.0 mm. The cold rolled sheets were then heated to 460° C. and allowed to soak for 60 seconds in a salt bath. The sheets were then quenched using water or forced air and then aged using the conditions described below.

To reach the T4 temper, the cold rolled sheets were either held for 10 days at room temperature after water quenching ("T4-1 Condition") or held at room temperature for seven days, and then heated at 70° C. for four days ("T4-2 Condition"). The latter conditions simulate a 90 day aging process at room temperature.

To reach the T6 temper, the T4 temper material was further heated to 95° C. and allowed to soak for eight hours, and then further heated to 145° C. and soaked for 6 hours ("T6-1 Condition"). Alternatively, the T6 temper was reached by holding the cold rolled sheets for 1 day at room temperature and then further heating the sheet to 120° C. and soaking the sheet for 24 hours ("T6-2 Condition"). As a third option, the T6 temper was reached by holding the cold rolled sheets for 1 day at room temperature, heating the sheet to 120° C. and soaking for 1 hour, and further heating the sheet to 180° C. and soaking for 30 minutes to simulate paint bake conditions for automotive applications ("T6-3 Condition").

The sheets were then tested for tensile properties according to ISO 6892, bending behavior according to VDA 238-100, and age hardening properties. Specifically, the water quenched sheets in T4 temper using condition T4-1 were tested for yield strength (YS), ultimate tensile strength (UTS), uniform elongation, total elongation, and plastic strain ratio (referred to as r-value or Lankford value) at angles 0°, 45°, and 90° to the rolling direction. The data are provided below in Table 16 and are also depicted in FIGS. 6-9. The copper-free variants showed a very anisotropic behavior, as demonstrated through the high r45 values.

TABLE 16

|      |     | YS (MPa) | UTS (MPa) | Uniform Elongation (%) | Total elongation A80 (%) | Plastic strain ratio r — |
|------|-----|----------|-----------|------------------------|--------------------------|-------------------------|
| K303 | 0°  | 292      | 389       | 13.2                   | 14.8                     | 0.23                    |
|      | 45° | 263      | 345       | 23.1                   | 24.7                     | 2.12                    |
|      | 90° | 290      | 380       | 18.4                   | 20.9                     | 0.61                    |
| K304 | 0°  | 313      | 422       | 16.9                   | 16.9                     | 0.26                    |
|      | 45° | 281      | 377       | 20.0                   | 27.0                     | 1.79                    |
|      | 90° | 313      | 413       | 17.9                   | 18.9                     | 0.59                    |
| K305 | 0°  | 331      | 444       | 14.9                   | 15.3                     | 0.25                    |
|      | 45° | 297      | 386       | 21.1                   | 27.4                     | 1.98                    |
|      | 90° | 328      | 429       | 17.8                   | 22.1                     | 0.64                    |
| K306 | 0°  | 328      | 436       | 14.7                   | 15.8                     | 0.27                    |
|      | 45° | 301      | 405       | 22.0                   | 24.7                     | 1.82                    |
|      | 90° | 328      | 429       | 17.9                   | 19.0                     | 0.57                    |
| K307 | 0°  | 327      | 440       | 13.7                   | 14.6                     | 0.27                    |
|      | 45° | 285      | 377       | 25.3                   | 26.5                     | 1.93                    |
|      | 90° | 319      | 421       | 17.2                   | 18.3                     | 0.66                    |
| K308 | 0°  | 329      | 436       | 13.9                   | 14.5                     | 0.24                    |
|      | 45° | 297      | 385       | 21.8                   | 26.4                     | 2.03                    |
|      | 90° | 326      | 418       | 16.3                   | 21.2                     | 0.62                    |
| K309 | 0°  | 374      | 488       | 15.7                   | 16.1                     | 0.27                    |
|      | 45° | 331      | 427       | 20.0                   | 27.0                     | 2.06                    |
|      | 90° | 371      | 469       | 16.1                   | 20.2                     | 0.62                    |
| K311 | 0°  | 297      | 445       | 19.5                   | 21.5                     | 0.43                    |
|      | 45° | 293      | 436       | 22.0                   | 25.4                     | 0.98                    |
|      | 90° | 303      | 455       | 20.6                   | 22.1                     | 0.62                    |

Figure 10:
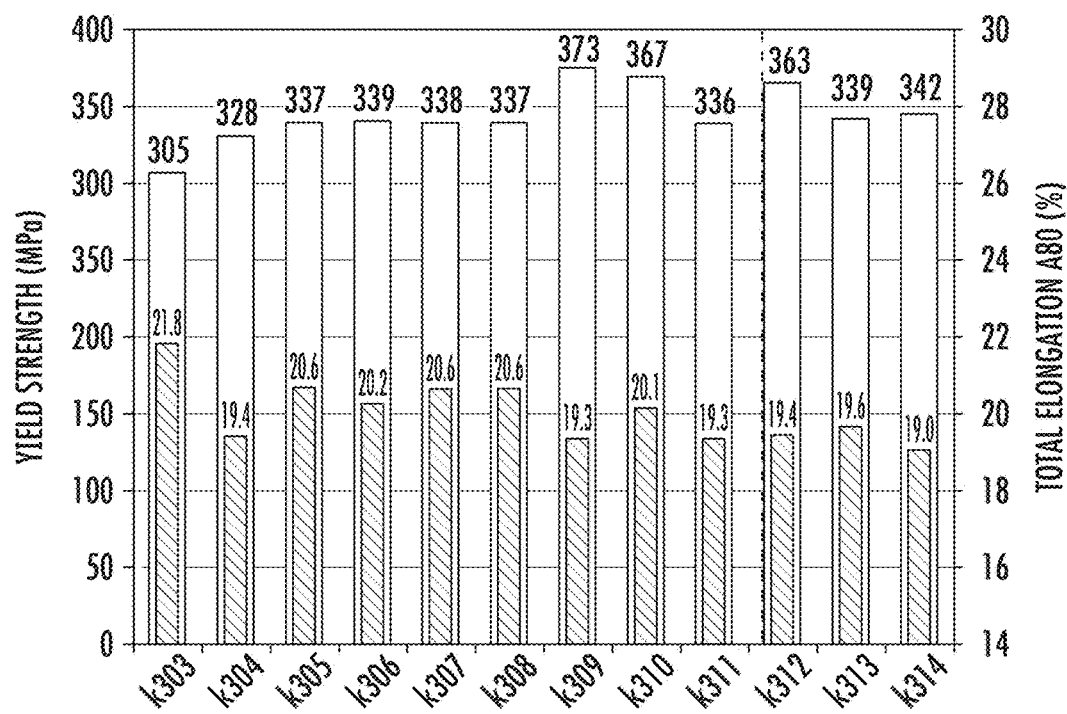
FIG. 10 is a graph showing the yield strength and total elongation of alloys K303, K304, K305, K306, K307, K308, K309, K310, K311, K312, K313, and K314 (all air cooled from the solution heat treatment temperature) in the T4 temper. The values represent the mean values of the three testing directions (angles 0°, 45°, and 90° to the rolling direction).
Figure 11:
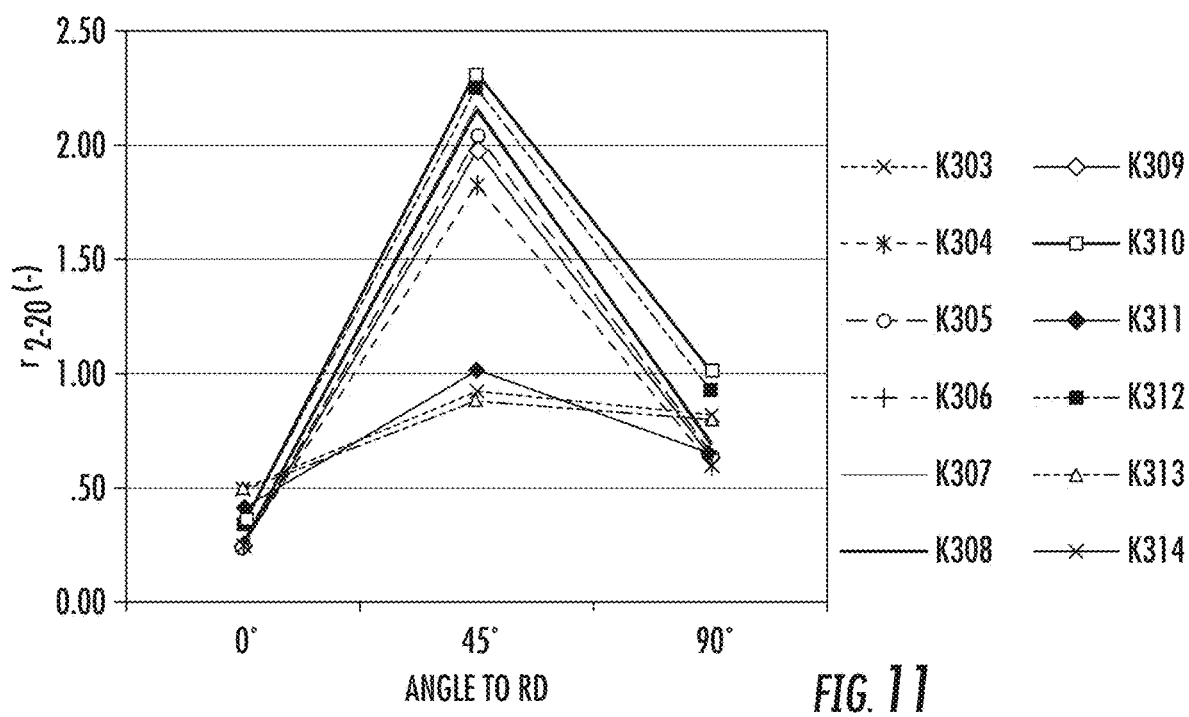
FIG. 11 is a graph showing the r values of alloys K303, K304, K305, K306, K307, K308, K309, K310, K311, K312, K313, and K314 in the T4 temper at angles 0°, 45°, and 90° to the rolling direction. The T4 temper was achieved by holding the sheet at room temperature for seven days and then heating at 70° C. for four days after air cooling from the solution heat treatment temperature.
Figure 12:
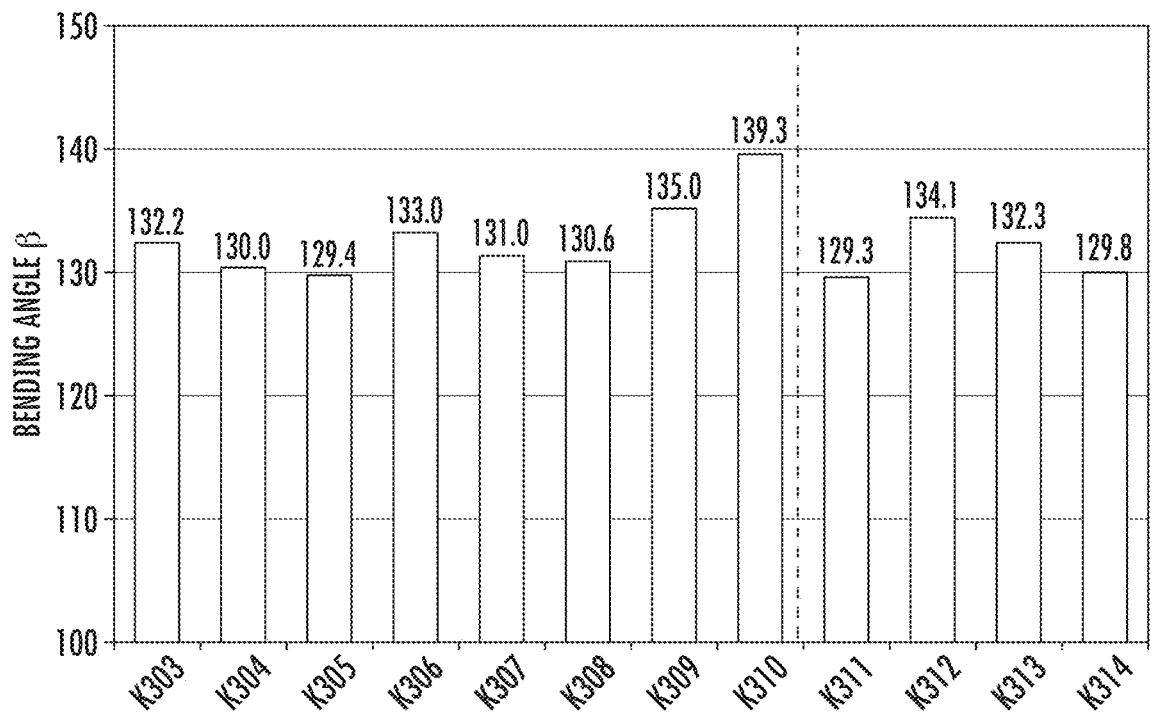
FIG. 12 is a graph showing the bending angle of alloys K303, K304, K305, K306, K307, K308, K309, K310, K311, K312, K313, and K314 (all air cooled from the solution heat treatment temperature) at angles 0°, 45°, and 90° to the rolling direction.

The sheets aged under condition T4-2 to reach the T4 temper were tested for yield strength (YS), total elongation, and plastic strain ratio (r-value) at angles 0°, 45°, and 90° to the rolling direction. The data are depicted in FIGS. 10 and 11. Similar to the sheets aged under condition T4-1, the copper-free variants showed a very anisotropic behavior as demonstrated through the high r45 values. The bendability was also measured, as shown in FIG. 12.

Figure 13:
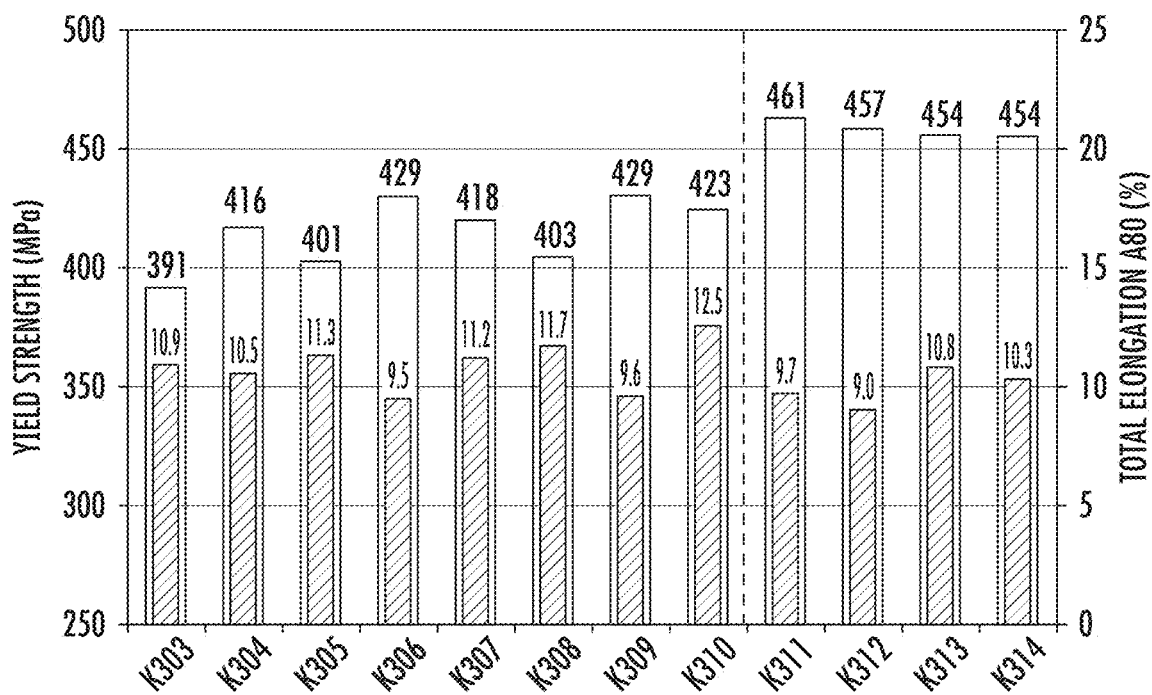
FIG. 13 is a graph showing the yield strength and total elongation of alloys K303, K304, K305, K306, K307, K308, K309, K310, K311, K312, K313, and K314 (all air cooled from the solution heat treatment temperature) in the T6 temper. The measurements were obtained in the transverse testing direction.
Figure 14:
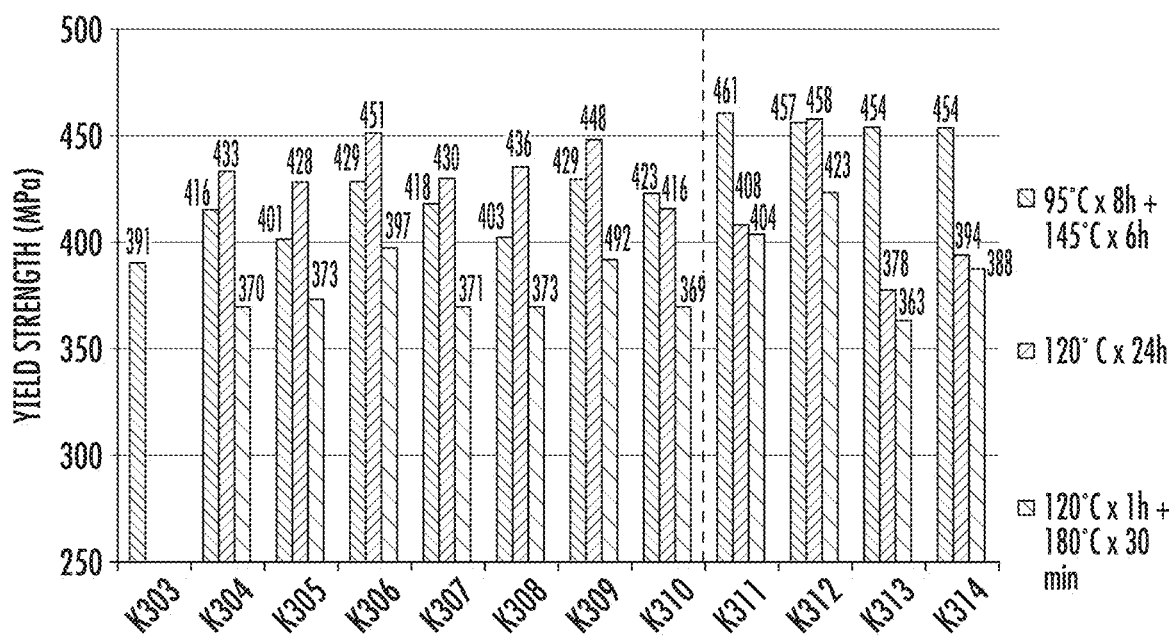
FIG. 14 is a graph showing the yield strength for alloys K303, K304, K305, K306, K307, K308, K309, K310, K311, K312, K313, and K314 (all air cooled from the solution heat treatment temperature) in the T6 temper obtained under three separate conditions. The measurements were obtained in the transverse testing direction. The left histogram bar in each set represents the T6 temper obtained by heating to 95° C. and soaking for eight hours, followed by heating to 145° C. and soaking for 6 hours. The middle histogram bar in each set represents the T6 temper obtained by holding the solution heat treated sheets for 1 day at room temperature and then further heating the sheet to 120° C. and soaking for 24 hours. The right histogram bar in each set represents the T6 temper obtained by holding the solution heat treated sheets for 1 day at room temperature, heating the sheet to 120° C. and soaking the sheet for 1 hour, and further heating the sheet to 180° C. and soaking for 30 minutes to represent paint baking.

The sheets aged under the three separate T6 conditions described above were also tested for yield strength and total elongation. The results are shown in FIGS. 13 and 14.

The results showed that the copper-free variants exhibited a very anisotropic behavior, as demonstrated by the high r45 values. The T6 strength level for the copper free alloys was between 390 to 430 MPa and the T6 strength level for copper containing alloys ranged from 450 to 460 MPa. The inclusion of copper caused an increase in T6 temper strength, but lower formability.

EXAMPLE 8

Eight alloys were prepared according to the methods described herein (see Table 17). The elemental compositions of the tested alloys are shown in Table 17, with the balance being aluminum. The elemental compositions are provided in weight percentages.

TABLE 17

| Alloy | Si | Fe | Cu | Mn | Mg | Zn | Ti | Zr | Zn + Mg + Cu |
|-------|------|------|------|------|------|------|------|------|------|
| K388 | 0.10 | 0.15 | 0.15 | 0.05 | 1.50 | 5.35 | 0.02 | 0.10 | 7.00 |
| K389 | 0.10 | 0.15 | 0.15 | 0.05 | 1.00 | 4.10 | 0.02 | 0.10 | 5.25 |
| K390 | 0.10 | 0.15 | 0.15 | 0.05 | 1.25 | 4.40 | 0.02 | 0.10 | 5.80 |
| K391 | 0.10 | 0.15 | 0.15 | 0.05 | 2.00 | 4.05 | 0.02 | 0.10 | 6.20 |
| K392 | 0.10 | 0.15 | 0.15 | 0.05 | 1.75 | 4.70 | 0.02 | 0.10 | 6.60 |
| K393 | 0.10 | 0.15 | 0.15 | 0.05 | 1.20 | 5.60 | 0.02 | 0.10 | 6.95 |
| K394 | 0.10 | 0.15 | 0.30 | 0.05 | 3.05 | 4.45 | 0.02 | 0.10 | 7.80 |
| K395 | 0.10 | 0.15 | 0.55 | 0.05 | 3.05 | 4.45 | 0.02 | 0.10 | 8.05 |

All expressed in wt. %.

EXAMPLE 9

Three variants of Alloy V6 were cast and subject to identical processing conditions for comparison. The elemental composition of the Alloy V6 is shown in Table 4, with the balance being aluminum. The elemental compositions are provided in weight percentages. The chemical compositions of the variants of Alloy V6 that were further investigated are presented in Table 19. All alloys were subject to the same solutionizing treatment.

TABLE 19

| Alloy | Zn | Cu | Mg | Fe | Si | Zr | Mn | Cr | Ti |
|-------|------|------|------|------|------|------|------|------|------|
| V6   | 8.98 | 0.30 | 2.31 | 0.20 | 0.10 | 0.10 | 0.05 | 0.04 | 0.02 |
| V6-6 | 8.98 | 0.30 | 2.31 | 0.20 | 0.10 | 0.05 | 0.05 | 0.04 | 0.02 |
| V6-7 | 8.98 | 0.30 | 2.31 | 0.20 | 0.10 | 0.15 | 0.05 | 0.04 | 0.02 |

All expressed in wt. %.

Figure 15A:
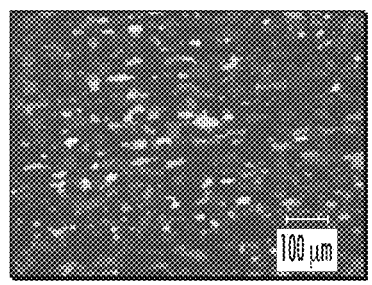
FIG. 15A is a polarized light micrograph showing the recrystallized microstructure of an aluminum alloy comprising a first zirconium (Zr) content.
Figure 15B:
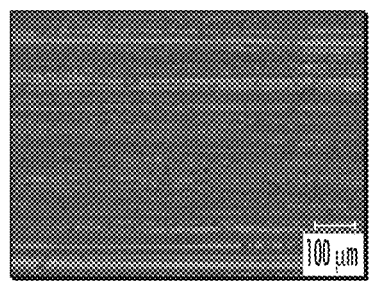
FIG. 15B is a polarized light micrograph showing the unrecrystallized microstructure of an aluminum alloy comprising a second Zr content.
Figure 15C:
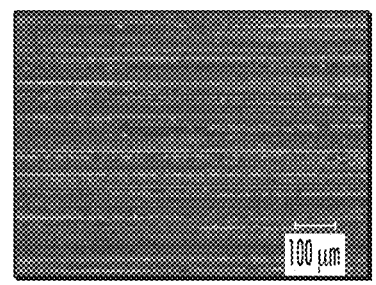
FIG. 15C is a polarized light micrograph showing the unrecrystallized microstructure of an aluminum alloy comprising a third Zr content.

Varying the amount of Zr in the alloy alters the microstructure. FIGS. 15A, 15B, and 15C show the effect of Zr amount on the alloy microstructure. Alloy V6-6 (FIG. 15A, 0.05 wt. % Zr) recrystallized, and alloys V6 (FIG. 15B, 0.10 wt. % Zr) and V6-7 (FIG. 15C, 0.15 wt. % Zr) did not recrystallize. In some cases, Zr amounts greater than 0.10 wt. % are sufficient to inhibit recrystallization.

EXAMPLE 10

Figure 16A:
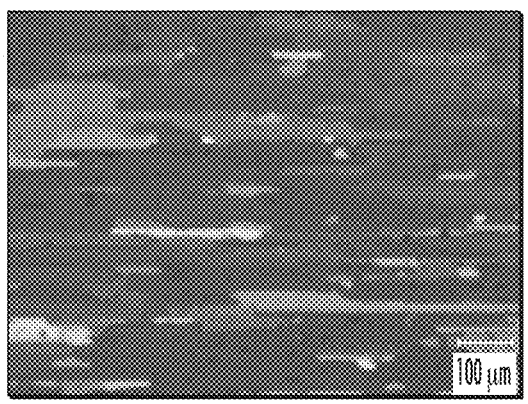
FIG. 16A is a polarized light micrograph showing the recrystallized microstructure of an aluminum alloy after processing.
Figure 16B:
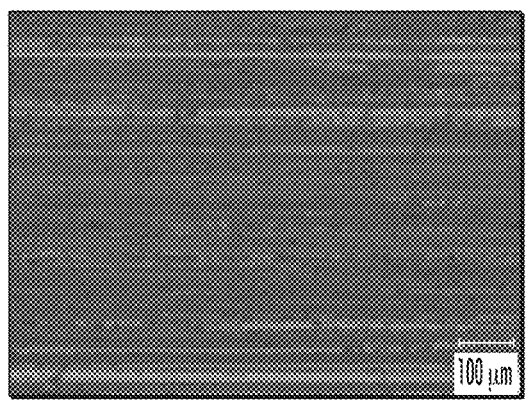
FIG. 16B is a polarized light micrograph showing the unrecrystallized microstructure of an aluminum alloy after processing.
Figure 17A:
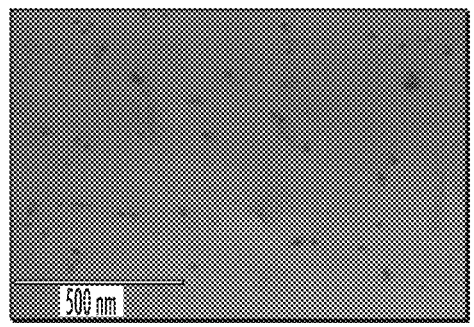
FIG. 17A is a SEM image of an aluminum alloy that recrystallized after processing showing $Al_3Zr$ dispersoids.
Figure 17B:
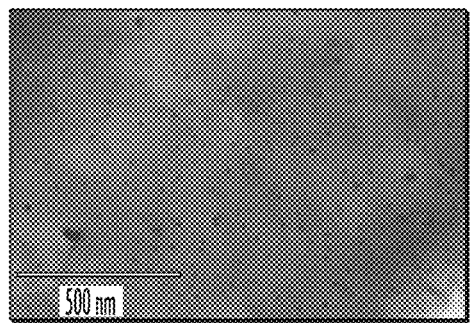
FIG. 17B is a SEM image of an aluminum alloy that did not recrystallize after processing showing $Al_3Zr$ dispersoids.

The elemental composition of the Alloys V4 and V6 are shown in Table 4, with the balance being aluminum. The elemental compositions are provided in weight percentages. The two alloys were cast and processed similarly in the laboratory. However, the final microstructure of the two alloys are significantly different after solutionizing as shown in FIG. 16A and 16B. FIG. 17A shows the SEM image of alloy V4 that is completely recrystallized while FIG. 17B is the SEM image of alloy V6 that is completely unrecrystallized after solutionizing.

The effect of Zr on the recrystallization kinetics can be attributed to $Al_3Zr$ dispersoids that are formed during homogenization. The $Al_3Zr$ dispersoids can inhibit recrystallization by pinning the grain boundaries. However, to be effective, these $Al_3Zr$ dispersoids should be coherent with the matrix, small in size, high in number and uniformly distributed throughout the microstructure. The $Al_3Zr$ dispersoids in the recrystallized alloy V4 (for example, those shown in FIG. 17A) are larger (about 20 nm diameter) and more sparse. The $Al_3Zr$ dispersoids in the unrecrystallized alloy V6 (for example, those shown in FIG. 17B) are smaller (about 8 nm diameter) and higher in number density. The larger size and low number density of the dispersoids in alloy V4 may not sufficiently pin the grain boundaries, allowing a high rate of recrystallization. On the contrary, the fine, well-dispersed dispersoids in alloy V6 can cause extensive pinning of the grain boundaries, thus inhibiting recrystallization. FIGS. 16A and 16B exemplify the recrystallization kinetics of the alloys presented in the micrographs in FIGS. 17A and 17B. FIG. 16A shows the recrystallization that occurred after processing and FIG. 16B shows the inhibited recrystallization due at least in part to the $Al_3Zr$ dispersoids. In some cases, the $Al_3Zr$ dispersoids can have a diameter of from about 5 nm to about 50 nm (e.g., from about 5 nm to about 20 nm, from about 8 nm to about 20 nm, or from about 5 nm to about 10 nm). In some cases, the $Al_3Zr$ dispersoids can have a diameter of less than about 20 nm (e.g., less than about 15 nm, less than about 10 nm, or less than about 8 nm). In some cases, the $Al_3Zr$ dispersoids can provide a unique unrecrystallized microstructure that can lead to higher strength. For example, in sheets comprising $Al_3Zr$ dispersoids, the sheet can have a yield strength of greater than about 500 MPa, greater than about 525 MPa, greater than about 550 MPa, greater than about 575 MPa, or greater than about 600 MPa.

The size, number and distribution of $Al_3Zr$ dispersoids can significantly affect the recrystallization behavior in 7xxx alloys. In some cases, the size, number and/or distribution of $Al_3Zr$ dispersoids can be controlled through alloy composition and processing. In some cases, uniformly distributed $Al_3Zr$ dispersoids of size less than about 10 nm can completely stop recrystallization of a cold rolled 7xxx alloy during standard solutionizing treatment (for example, 430-500° C. for 10 seconds - 6 hours). Composition and processing of 7xxx series Al alloys can be employed to control the microstructure of the alloys. Controlling microstructure can afford the ability to tailor the strength and ductility in 7xxx alloys.

EXAMPLE 11

Eight variants of alloy V6 were cast and subjected to identical processing conditions for strength comparison. The elemental composition of the eight variants including Alloy V6 are shown in Table 20, with the balance being aluminum. The elemental compositions are provided in weight percentages.

TABLE 20

| Alloy | Zn | Cu | Mg | Fe | Si | Zr | Mn | Cr | Ti |
|---|---|---|---|---|---|---|---|---|---|
| V6 | 8.98 | 0.30 | 2.31 | 0.20 | 0.10 | 0.10 | 0.05 | 0.04 | 0.02 |
| V6-1 | 8.95 | 0.57 | 2.38 | 0.18 | 0.11 | 0.09 | 0.039 | 0.04 | 0.01 |
| V6-2 | 8.95 | 0.88 | 2.34 | 0.22 | 0.12 | 0.09 | 0.044 | 0.04 | 0.01 |
| V6-3 | 9.16 | 1.18 | 2.29 | 0.23 | 0.1 | 0.11 | 0.042 | 0.04 | 0.01 |
| V6-4 | 8.91 | 1.55 | 2.3 | 0.18 | 0.1 | 0.01 | 0.042 | 0.03 | 0.01 |
| V6-5 | 9.01 | 2.05 | 2.26 | 0.2 | 0.09 | 0.09 | 0.041 | 0.03 | 0.01 |
| V6-6 | 8.94 | 0.27 | 2.29 | 0.19 | 0.09 | 0.04 | 0.04 | 0.04 | 0.01 |
| V6-7 | 9.1 | 0.27 | 2.36 | 0.19 | 0.12 | 0.15 | 0.044 | 0.04 | 0.01 |
| V6-8 | 9.05 | 0.26 | 2.34 | 0.18 | 0.12 | 0.03 | 0.09 | 0.09 | 0.01 |

All expressed in wt. %.

Ingots having the alloy composition shown above in Table 20 were homogenized according to the procedures described herein using the conditions recited in Table 5. Specifically, the ingots were heated to 460° C. or to 465° C. over 8 hours and then soaked for a period of time, as indicated in Table 5. The first heating and soaking is referred to as "Stage 1" in Table 5. Optionally, the ingots were further heated and soaked for a period of time in a second homogenization step, which is referred to as "Stage 2" in Table 5.

The ingots were then hot rolled from an initial thickness of 65 mm to a final thickness of 8 mm, using 14 hot rolling passes. The laydown temperatures for the hot rolling step ranged from 400° C. to 425° C. and the exit temperatures ranged from 315° C. to 370° C. The hot bands were immediately placed in a furnace to simulate coil cooling. The hot bands were then cold rolled to a final gauge thickness of approximately 2 mm (overall gauge reduction by 75%). The cold rolled sheets were then heated to 465° C. at a rate of approximately 283° C. per hour and allowed to soak for 1 hour. The sheets were then cooled to room temperature (approximately 25° C.) in a quenching step by using cold water or warm water and then aged.

Specifically, the alloys were quenched using water at approximately 55° C. (referred to in this example as the "warm water quench"). For the warm water quench, the sheet was cooled at a rate of approximately 150° C. per second to 350° C. per second. The sheets prepared from alloys V6-1 through V6-8 were aged by heating to a temperature of 125° C. for 24 hours (referred to in this example as the "T6" temper). The resulting yield strengths measured in longitudinal directions are shown in Table 21 below. For comparative purposes, the yield strength of alloy V6 (shown in Table 13) are also listed in Table 21. The T6 temper alloys were further aged by heating to a temperature of 180° C. for 0.5 hour (referred to in this example as the "paint bake" or "PB" condition). The resulting yield strength after T6+PB treatment are also presented in Table 21.

TABLE 21

| Alloy | Yield Strength (MPa) after aging for 24 hours at 125° C. (T6) | Yield Strength (MPa) after T6 + PB | Change in Yield Strength after PB (MPa) |
|---|---|---|---|
| V6 | 624 | 547 | −77 |
| V6-1 | 570 | 541 | −29 |
| V6-2 | 560 | 566 | 6 |
| V6-3 | 623 | 597 | −26 |
| V6-4 | 578 | 576 | −2 |
| V6-5 | 571 | 581 | 10 |
| V6-6 | 546 | 520 | −26 |
| V6-7 | 630 | 544 | −86 |
| V6-8 | 593 | 543 | −50 |

As can be seen in Table 21, alloy V6 showed a high yield strength (i.e., 624 MPa) in T6 temper. However, the additional PB treatment caused a significant drop in yield strength, i.e., by 77 MPa to 547 MPa. The eight variants discussed herein were designed to alleviate the reduction in strength after PB while still keeping the yield strength in T6 temper greater than about 600 MPa. It is apparent from the results presented in Table 21 that the alloy variant V6-3 meets this criteria, which showed a YS of 623 MPa in T6 temper and 597 MPa after the additional PB treatment. Alloy V6-3 had only a 26 MPa drop in yield strength after additional PB treatment in comparison to 77 MPa and 86 MPa drop respectively for V6 and V6-7, the other two alloys that had T6 strength greater than 600 MPa.

As another example, alloy V12 is an alloy (composition shown in Table 4) that has a very low drop in yield strength after paint baking from T6 temper. The yield strength drops from 613 MPa in T6 temper to 605 MPa after paint baking, a drop of 8 MPa only. Such an alloy has a fully unrecrystallized microstructure that contributes to the high strength. This alloy can be used in applications requiring good fracture toughness and fatigue performance

EXAMPLE 12

Figure 18A:
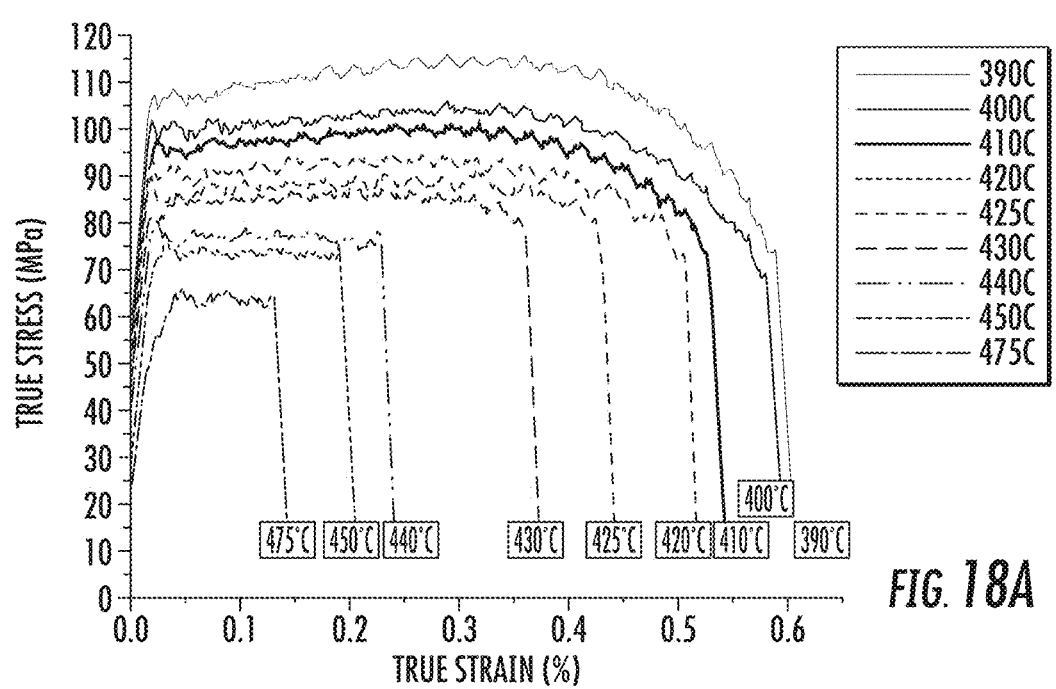
FIG. 18A is a graph showing the stress-strain curves of comparative alloy AA7075.
Figure 18B:
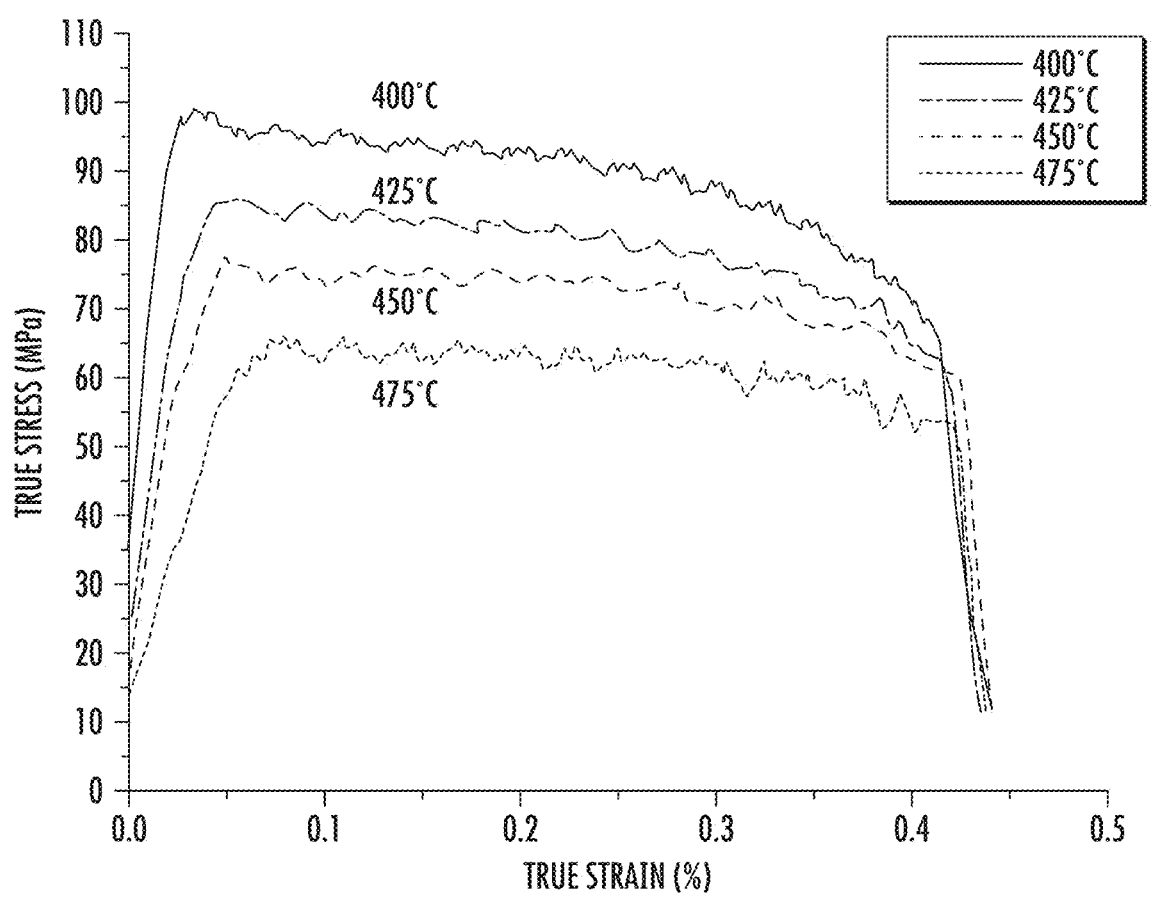
FIG. 18B is a graph showing the stress-strain curves of exemplary Alloy V6 tested at different temperatures.

The alloys discussed herein may undergo a hot forming or hot stamping process to form the desired parts. In the hot forming process the alloy sheet is typically heated to a temperature that is above the solutionizing temperature of the specific alloy. The solutionizing temperature can be in a range of approximately 400° C. to approximately 600° C. After solutionizing, the alloy sheet is transferred to a press where it is formed into the desired shape and cooled by the die simultaneously. Therefore, to be able to form into complex shapes, it is important that the alloy has good ductility or formability at elevated temperatures. In some cases the 7xxx alloys show a decrease in ductility when heated above certain temperatures, for example, Alloy 7075 as shown in FIG. 18A. In other cases, Alloy V6 shows no decrease in ductility at high temperatures as shown in FIG. 18B, which makes the alloy more suitable for hot forming applications.

In addition to use in the automotive sector, the alloys of the present invention may also be used in the aerospace and consumer electronics sectors as well. For aerospace, the alloys can find use in structural and non-structural applications. For structural body parts, the structural body parts can be for example, wings, fuselages, ailerons, rudders, elevators, cowlings, or supports. For non-structural body parts, the non-structural body parts can be for example, seat tracks, seat frames, panels, or hinges. The unrecrystallized microstructure allows for improved fracture toughness and fatigue performance. For consumer electronics, the alloys of the present invention may be used for cell phone cases, laptops, tablets, televisions, etc.

EXAMPLE 13

In another example, ingots having the alloy composition V6-3 and V6-7 shown above in Table 20 were homogenized according to the procedures described herein using the conditions recited in Table 5. Specifically, the ingots were heated to 460° C. or to 465° C. over 8 hours and then soaked for a period of time, as indicated in Table 5. The first heating and soaking is referred to as "Stage 1" in Table 5. Optionally, the ingots were further heated and soaked for a period of time in a second homogenization step, which is referred to as "Stage 2" in Table 5.

The ingots were then hot rolled from an initial thickness of 65 mm to a final thickness of 8 mm, using 14 hot rolling passes. The laydown temperatures for the hot rolling step ranged from 400° C. to 425° C. and the exit temperatures ranged from 315° C. to 370° C. The hot bands were immediately placed in a furnace to simulate coil cooling. The hot bands were then cold rolled to a final gauge thickness of approximately 2 mm (overall gauge reduction by 75%). The cold rolled sheets were then heated to 465° C. at a rate of approximately 283° C. per hour and allowed to soak for 1 hour. The sheets were then cooled to room temperature (approximately 25° C.) in a quenching step by using cold water or warm water and then aged.

Specifically, the alloys were quenched using water at approximately 55° C. (referred to in this example as the "warm water quench"). For the warm water quench, the sheet was cooled at a rate of approximately 150° C. per second to 350° C. per second. In contrast to Example 11, the sheets prepared from alloys V6-3 and V6-7 in Example 13 were not aged by heating to form a T6 temper, but instead hot formed and then directly paint baked without undergoing T6 temper. The V6-3 and V6-7 alloys of Example 12 were further aged by heating to a temperature of 180° C. for 0.5 hour (referred to in this example as the "paint bake" or "PB" condition). The resulting yield strength after PB treatment are also presented in Table 22.

TABLE 22

| Alloy | Yield Strength (MPa) after PB |
|---|---|
| V6-3 | 580 |
| V6-7 | 560 |

As can be seen in Tables 21 and 22, alloy V6-3 processed according to Example 13 shows a yield strength of 580 MPa after aging by heating to a temperature of 180° C. for 0.5 hour (referred to in this example as the "paint bake" or "PB" condition) directly after hot forming without undergoing T6 treatment as compared to the alloy V6-3 processed according to Example 11, which shows a yield strength of 597 MPa after aging the alloy to T6 temper and additional PB treatment. Alloy V6-7 processed according to Example 13 shows a yield strength of 560 MPa after aging by paint bake directly after hot forming without undergoing T6 treatment as compared to the alloy V6-7 processed according to Example 11, which shows a yield strength of 544 MPa after aging the alloy to T6 temper and additional PB treatment. As can be seen in Table 22, alloys V6-3 and V6-7 showed a high yield strength by conducting a paint bake treatment directly after hot forming without undergoing T6.

All patents, patent applications, publications, and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those of ordinary skill in the art without departing from the spirit and scope of the invention as defined in the following claims.

What is claimed is:

1. An aluminum alloy sheet comprising 8.0-9.2 wt. % Zn, less than 1.0 wt. % Cu, 1.6-2.6 wt. % Mg, 0.11-0.25 wt. % Fe, 0.07-0.15 wt. % Si, 0.09-0.15 wt. % Zr, 0.02-0.05 wt. % Mn, 0.03-0.05 wt. % Cr, 0.003-0.035 wt. % Ti, 0.01-0.20 wt. % of one or more of Mo, Nb, Be, B, Co, Sn, Sr, V, In, Hf, Ag, and Ni, up to 0.15 wt. % of impurities, and Al,
   wherein the aluminum alloy sheet has a gauge of up to 10.0 mm;
   wherein the aluminum alloy sheet has a yield strength greater than 500 MPa in a T6 temper;
   wherein the aluminum alloy sheet comprises $Al_3Zr$ dispersoids having a diameter of about 5 nm to about 50 nm;
   wherein the aluminum alloy sheet comprises an unrecrystallized microstructure; and
   wherein the aluminum alloy sheet has a maximum corrosion test resultant pit depth of less than 40 microns after being immersed in a solution containing 57 g/L NaCl and 10 mL $H_2O_2$ for 24 hours and an average corrosion test resultant pit depth of less than 20 microns.

2. The aluminum alloy of claim 1, comprising 8.9-9.2 wt. % Zn, 0.2-2.1 wt. % Cu, 2.2-2.4 wt. % Mg, 0.18-0.23 wt. % Fe, 0.09-0.12 wt. % Si, 0.05-0.15 wt. % Zr, 0.04-0.09 wt. % Mn, 0.03-0.09 wt. % Cr, 0.01-0.02 wt. % Ti, and up to 0.15 wt. % of impurities, and Al.

3. The aluminum alloy of claim 1, comprising 9 wt. % Zn, 0.3% Cu, 2.3 wt. % Mg, 0.2 wt. % Fe, 0.1 wt. % Si, 0.1 wt. % Zr, 0.05 wt. % Mn, 0.04 wt. % Cr, 0.02 wt. % Ti, and up to 0.15 wt. % of impurities, and Al.

4. The aluminum alloy of claim 1, further comprising 0.05-0.20% of one or more of Mo, Nb, Be, B, Co, Sn, Sr, V, In, Hf, Ag, Sc and Ni.

5. The aluminum alloy of claim 1, further comprising 0.01-0.10% of a rare earth element selected from the group consisting of Y, La, Ce, Pr, Nd, Pm, Sm, Eu, Gd, Tb, Dy, Ho, Er, Tm, Yb, and Lu.

6. An automotive body part comprising the aluminum alloy sheet of claim 1.

7. The automotive body part of claim 6, wherein the automotive body part is a motor vehicle body part.

8. The automotive body part of claim 7, wherein the motor vehicle body part is a bumper, a side beam, a roof beam, a cross beam, a pillar reinforcement, an inner panel, an outer panel, a side panel, an inner hood, an outer hood, or a trunk lid panel.

9. An electronic device housing comprising the aluminum alloy sheet of claim 1.

10. An aerospace body part comprising the aluminum alloy sheet of claim 1.

11. The aerospace body part of claim 10, wherein the aerospace body part is a structural aerospace body part or a non-structural aerospace body part.

12. The aerospace body part of claim 11, wherein the structural aerospace body part is a wing, a fuselage, an aileron, a rudder, an elevator, a cowling or a support.

13. The aerospace body part of claim 11, wherein the non-structural aerospace body part is a seat track, a seat frame, a panel or a hinge.

14. The aluminum alloy sheet of claim 1, wherein the aluminum alloy sheet has a yield strength of greater than 550 MPa.

15. The aluminum alloy sheet of claim 1, wherein the aluminum alloy sheet has a yield strength of greater than 600 MPa.

16. A method of producing an aluminum alloy sheet, comprising:
casting an aluminum alloy to form an ingot or a slab, wherein the aluminum alloy comprises about 8.0-9.2 wt. % Zn, less than 1 wt. % Cu, 1.6-2.6 wt. % Mg, 0.10-0.25 wt. % Fe, 0.07-0.15 wt. % Si, 0.09-0.15 wt. % Zr, 0.02-0.05 wt. % Mn, 0.03-0.05 wt. % Cr, 0.003-0.035 wt. % Ti, 0.01-0.20 wt. % of one or more of Mo, Nb, Be, B, Co, Sn, Sr, V, In, Hf, Ag, and Ni, up to 0.15 wt. % of impurities, and Al,
homogenizing the ingot or the slab;
hot rolling the ingot or the slab to produce a hot band; and
cold rolling the hot band to produce an aluminum alloy sheet with a final gauge, wherein the final gauge of the aluminum alloy sheet is up to 10.0 mm;
wherein the aluminum alloy sheet has a yield strength greater than 500 MPa in a T6 temper,
wherein the aluminum alloy sheet comprises Al3Zr dispersoids having a diameter of about 5 nm to about 50 nm,
wherein the aluminum alloy sheet comprises an unrecrystallized microstructure, and
wherein the aluminum alloy sheet has a maximum corrosion test resultant pit depth of less than 40 microns after being immersed in a solution containing 57 g/L NaCl and 10 mL $H_2O_2$ for 24 hours and an average corrosion test resultant pit depth of less than 20 microns.

17. The method of claim 16, further comprising subjecting the sheet to a solution heat treatment at a temperature of from 430° C. to 600° C.

18. The method of claim 16, further comprising subjecting the sheet to a solution heat treatment at a temperature of from 430° C. to 500° C.

19. The method of claim 18, further comprising cooling the sheet to a temperature of from 25° C. to 120° C.

20. The method of claim 19, wherein the step of cooling the sheet is performed at a cooling rate from 200° C. per second to 600° C. per second.

21. The method of claim 19, wherein the step of cooling the sheet is performed at a cooling rate from 2000° C. per second to 3000° C. per second.

22. The method of claim 19, further comprising subjecting the sheet to an aging process.

23. The method of claim 22, wherein the aging process comprises:
heating the sheet to a temperature of from 100° C. to 140° C.;
maintaining the sheet at a temperature of from 100° C. to 140° C. for a period of time; and
cooling the sheet to room temperature.

24. The method of claim 22, wherein the aging process comprises:
heating the sheet to a temperature of from 100° C. to 140° C.;
maintaining the sheet at a temperature of from 100° C. to 140° C. for a first period of time;
heating the sheet to a temperature greater than 140° C.;
maintaining the sheet at a temperature greater than 140° C. for a second period of time; and
cooling the sheet to room temperature.

25. The method of claim 19, further comprising subjecting the sheet to paint bake heat treatment.

26. An aluminum sheet made according to the method of claim 16.

27. The sheet of claim 26, wherein the sheet is in the T6 temper.

28. The sheet of claim 27, wherein the sheet has a yield strength of greater than 500 MPa.

29. The sheet of claim 26, wherein the sheet comprises $Al_3Zr$ dispersoids having a diameter of 8 nm to 20 nm.

30. The sheet of claim 26, wherein the sheet comprises $Al_3Zr$ dispersoids having a diameter less than 10 nm.

31. An aluminum alloy sheet comprising 8.0-9.3 wt. % Zn, less than 1 wt. % Cu, 1.4-2.8 wt. % Mg, 0.1-0.35 wt. % Fe, 0.05-0.2 wt. % Si, 0.05-0.15 wt. % Zr, 0.01-0.05 wt.% Mn, 0.01-0.05 wt. % Cr, 0.001-0.05 wt. % Ti, up to 0.15 wt. % of impurities, and Al,
wherein the aluminum alloy sheet has a gauge of up to 10.0 mm;
wherein the aluminum alloy sheet has a yield strength greater than 500 MPa in a T6 temper; and
wherein the aluminum alloy sheet has a maximum corrosion test resultant pit depth of less than 40 microns after being immersed in a solution containing 57 g/L NaCl and 10 mL $H_2O_2$ for 24 hours.

* * * * *